(12) United States Patent  
Saito et al.

(10) Patent No.: US 10,503,440 B2  
(45) Date of Patent: Dec. 10, 2019

(54) COMPUTER SYSTEM, AND DATA MIGRATION METHOD IN COMPUTER SYSTEM

(71) Applicant: HITACHI, LTD., Tokyo (JP)

(72) Inventors: Hideo Saito, Tokyo (JP); Hiroshi Nasu, Tokyo (JP); Shunji Kawamura, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 202 days.

(21) Appl. No.: 15/542,762

(22) PCT Filed: Jan. 21, 2015

(86) PCT No.: PCT/JP2015/051435  
§ 371 (c)(1),  
(2) Date: Jul. 11, 2017

(87) PCT Pub. No.: WO2016/117040  
PCT Pub. Date: Jul. 28, 2016

(65) Prior Publication Data  
US 2017/0371587 A1    Dec. 28, 2017

(51) Int. Cl.  
*G06F 3/06* (2006.01)

(52) U.S. Cl.  
CPC .......... *G06F 3/0665* (2013.01); *G06F 3/0617* (2013.01); *G06F 3/0634* (2013.01);  
(Continued)

(58) Field of Classification Search  
CPC ........ G06F 3/067; G06F 3/0647; G06F 3/065; G06F 3/0635; G06F 11/2082; G06F 11/2064; G06F 3/0662  
See application file for complete search history.

(56) References Cited

U.S. PATENT DOCUMENTS

| 2012/0036330 A1 | 2/2012 | Saito et al. |
| 2012/0226860 A1 | 9/2012 | Saito et al. |
| 2013/0080723 A1* | 3/2013 | Sawa ................ G06F 3/0607 711/162 |

FOREIGN PATENT DOCUMENTS

| JP | 2013-543997 A | 12/2013 |
| JP | 5620614 B1 | 11/2014 |
| WO | 2012/017493 A1 | 2/2012 |

OTHER PUBLICATIONS

International Search Report, PCT/JP2015/051435, dated Apr. 14, 2015, 1 pg.

* cited by examiner

*Primary Examiner* — Reginald G Bragdon  
*Assistant Examiner* — Thanh D Vo  
(74) *Attorney, Agent, or Firm* — Volpe and Koenig, P.C.

(57) ABSTRACT

In a computer system, when a first high availability (HA) pair is configured with a first logical device of a first storage apparatus and a second logical device of a second storage apparatus, the first logical device is virtualized on a third storage apparatus and is set to correspond with a third logical device of the third storage apparatus. A fourth storage apparatus virtualizes the second logical device and sets the second logical device to correspond with a fourth logical device of the fourth storage apparatus. After a second HA pair is configured with the third logical device and the fourth logical device, the data on the first logical device is migrated to the third storage apparatus and managed as data on the third logical device. The data on the second logical device is migrated to the fourth storage apparatus and managed as data on the fourth logical device.

8 Claims, 18 Drawing Sheets

(52) U.S. Cl.
CPC .......... *G06F 3/0635* (2013.01); *G06F 3/0647* (2013.01); *G06F 3/0655* (2013.01); *G06F 3/0656* (2013.01); *G06F 3/0658* (2013.01); *G06F 3/0662* (2013.01); *G06F 3/0671* (2013.01)

| Virtual device number | Device type | RAID level | Storage device number | External volume WWN | External volume LUN |
|---|---|---|---|---|---|
| 32A | External | Undefined | Undefined | 302C | 0 |
| 32A' | Internal | 1 | 32A', 31A" | Undefined | Undefined |
| ... | ... | ... | ... | ... | ... |

| Pair number | Logical device number | Volume attribute | Opposite-party apparatus product number | Opposite-party logical device number |
|---|---|---|---|---|
| 0 | 100 | Primary | 30000 | 100 |
| 1 | 200 | Primary | 30000 | 100 |
| 2 | 300 | Secondary | 40000 | 200 |
| 3 | 400 | Secondary | 40000 | 300 |
| ... | ... | ... | ... | ... |

| Cache address | Logical device number | LBA | Data attribute |
|---|---|---|---|
| 0 | 100 | 1000 | Clean |
| 1 | 100 | 2000 | Clean |
| 2 | 200 | 1500 | Clean |
| 3 | 200 | 2000 | Dirty |
| ... | ... | ... | ... |

COMPUTER SYSTEM, AND DATA MIGRATION METHOD IN COMPUTER SYSTEM

TECHNICAL FIELD

The present invention relates to a computer system, and a data migration method in the computer system.

BACKGROUND ART

It is desirable that a computer system for allowing companies and the like to process operations for conducting business be capable of continuing the operations during system migration.

Background arts in this technical field include a technology described in International Publication No. WO 2012/017493 (PTL 1). PTL 1 describes "a computer system and a data migration method that can perform a storage apparatus replacing operation while avoiding stoppage of transmission and reception of data between a host computer and a storage apparatus".

CITATION LIST

Patent Literature

[PTL 1] International Publication No. WO 2012/017493

SUMMARY OF INVENTION

Technical Problem

In a computer system, a primary storage apparatus and a secondary storage apparatus adopt a High Availability (HA) configuration and configure an HA pair that allows the logical devices of the primary storage apparatus and the secondary storage apparatus to duplicate data, thereby enabling the availability of the computer system to be improved. Also in a case where one or both of the logical devices of this HA pair are migrated to other storage apparatuses, there is new demand for maintaining the HA configuration.

With only migration of one or both of the logical devices of the HA pair to the other storage apparatuses by the technique of PTL 1, the migrated logical devices do not configure an HA pair, which cannot maintain the HA configuration.

Solution to Problem

To solve the above problem, according to the present invention, when a first HA pair is configured with a first logical device of a first storage apparatus and a second logical device of a second storage apparatus in a computer system, the first logical device is virtualized on a third storage apparatus and is set to correspond with a third logical device of the third storage apparatus. A fourth storage apparatus virtualizes the second logical device and sets the second logical device to correspond with a fourth logical device of the fourth storage apparatus. After a second HA pair has been configured with the third logical device and the fourth logical device, the data on the first logical device is migrated to the third storage apparatus and managed as data on the third logical device. The data on the second logical device is migrated to the fourth storage apparatus and managed as data on the fourth logical device.

Advantageous Effects of Invention

The computer system of the present invention can migrate one or both of the logical devices of the HA pair to other storage apparatuses while maintaining the HA configuration, and improve the availability of the computer system. Problems, configurations and advantageous effects other than those described above are clarified by the following Description of Embodiments.

BRIEF DESCRIPTION OF DRAWINGS

FIG. 5 is a diagram showing a configuration of a virtual device management table.

FIG. 7 is a diagram showing a configuration of a pair management table.

FIG. 8 is a diagram showing a configuration of a cache management table.

DESCRIPTION OF EMBODIMENTS

Embodiments are hereinafter described with reference to the drawings.

Embodiment 1

Figure 1:
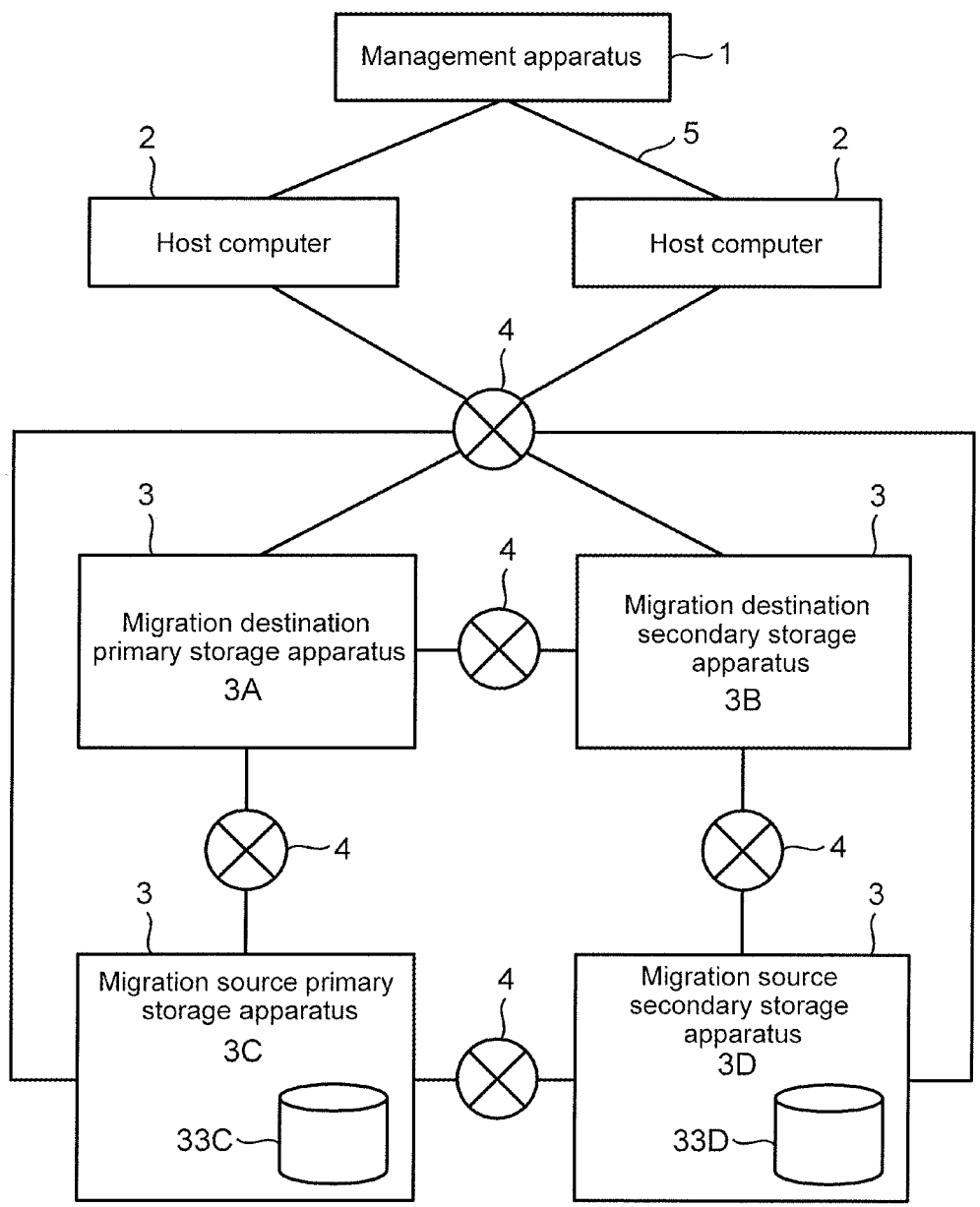
FIG. 1 is a diagram showing a configuration of a computer system of Embodiment 1.

FIG. 1 is a diagram showing a configuration of a computer system. The computer system (storage system) includes one or more management apparatuses 1, a plurality of storage apparatuses 3, one or more host computers 2, and networks 4. The storage apparatuses 3 and the host computers 2, and the storage apparatuses 3 are coupled to each other via the networks 4. The networks 4 are, for example, SANs (Storage Area Networks).

The one or more management apparatuses 1 are management computers that are coupled to the host computers 2 and the storage apparatuses 3 via a network 5, and manage the host computers 2 and the storage apparatuses 3. The management apparatus 1 includes a port coupled to the network 5, a CPU, and a memory. The management apparatus 1 is operated by a manager who manages the host computer 2, or a manager who manages the storage apparatus 3.

A migration destination primary storage apparatus 3A, a migration destination secondary storage apparatus 3B, a migration source primary storage apparatus 3C, and a migration source secondary storage apparatus 3D are hereinafter described as the storage apparatuses 3. The migration source primary storage apparatus 3C includes a migration source primary logical device 33C. The migration source secondary storage apparatus 3D includes a migration source secondary logical device 33D.

Upon receipt of an Inquiry request (query request) from the host computer 2, the migration source primary storage apparatus 3C and the migration source secondary storage apparatus 3D respond with the same volume ID 30126 with respect to the migration source primary logical device 33C and the migration source secondary logical device 33D. A pair, such as of the migration source primary logical device 33C and the migration source secondary logical device 33D, is called a High Availability (HA) pair. As with the migration source primary storage apparatus 3C and the migration source secondary storage apparatus 3D, the configuration of multiple storage apparatuses 3 including an HA pair is called an HA configuration.

The host computer 2 recognizes the migration source primary logical device 33C of the migration source primary storage apparatus 3C and the migration source secondary logical device 33D of the migration source secondary storage apparatus 3D, as a single logical device (hereinafter called a virtual logical device) in a single storage apparatus (hereinafter called a virtual storage apparatus), on the basis of the response to the Inquiry request. When the host computer 2 transmits input and output requests (a read request and a write request) destined for the virtual logical device, the input and output requests are transmitted to any of the migration source primary logical device 33C and the migration source secondary logical device 33D, which forms the HA pair.

In response to the write request issued from the host computer 2, data written in one element (migration source primary logical device 33C) that is of the HA pair and is included in the migration source primary storage apparatus 3C is also stored in the other element (migration source secondary logical device 33D) that is of the HA pair and is included in the migration source secondary storage apparatus 3D, and the HA pair made up of the migration source primary storage apparatus 3C and the migration source secondary storage apparatus 3D holds the same data. Thus, for example, in case one of the migration source primary storage apparatus 3C and the migration source secondary storage apparatus 3D fails, the host computer 2 can continue data input and output using the logical device 33 that is of the HA pair and is included in the other storage apparatus 3.

The HA pair made up of the migration source primary storage apparatus 3C and the migration source secondary storage apparatus 3D holds the same data. Consequently, either element of the HA pair can accept the input and output requests issued from the host computer 2 and destined for the virtual logical device. Accordingly, resources, such as the path bandwidth, the processing performance of a controller 30, and the processing performance of a storage device 31 can be effectively utilized. The HA pair, such of the migration source primary logical device 33C and the migration source secondary logical device 33D having such characteristics, is called an Active-Active type HA pair.

The computer system of this embodiment can migrate the Active-Active type HA pair made up of the migration source primary storage apparatus 3C and the migration source secondary storage apparatus 3D to the migration destination primary storage apparatus 3A and the migration destination secondary storage apparatus 3B while maintaining the HA configuration. Here, the HA pair migration is to migrate data in the migration source primary logical device 33C of the migration source primary storage apparatus 3C to the migration destination primary storage apparatus 3A, and migrate data in the migration source secondary logical device 33D of the migration source secondary storage apparatus 3D to the migration destination secondary storage apparatus 3B, thereby providing the HA pair for the host computer 2 through the migration destination primary storage apparatus 3A and the migration destination secondary storage apparatus 3B.

The migration destination primary storage apparatus 3A and the migration destination secondary storage apparatus 3B, to which the HA pair has been migrated, constitute the HA configuration, as with the migration source primary storage apparatus 3C and the migration source secondary storage apparatus 3D before migration. Thus, in case one of the migration destination primary storage apparatus 3A and the migration destination secondary storage apparatus 3B fails, the host computer 2 can continue data input and output using the logical device 33 that is of the HA pair after migration and is included in the other storage apparatus 3.

According to this embodiment, the storage apparatuses 3 constituting the HA configuration can maintain the HA configuration during and after migration of the HA pair. Consequently, for example, in case any one of the migration destination primary storage apparatus 3A, the migration destination secondary storage apparatus 3B, the migration source primary storage apparatus 3C and the migration source secondary storage apparatus 3D fails, the host computer 2 can continue data access and the computer system can maintain high availability.

An HA pair migration method in the computer system of this embodiment is applicable to a case of replacing the migration source primary storage apparatus 3C and the migration source secondary storage apparatus 3D having the HA pair with the migration destination primary storage apparatus 3A and the migration destination secondary storage apparatus 3B, respectively, while maintaining the HA configuration.

Figure 2:
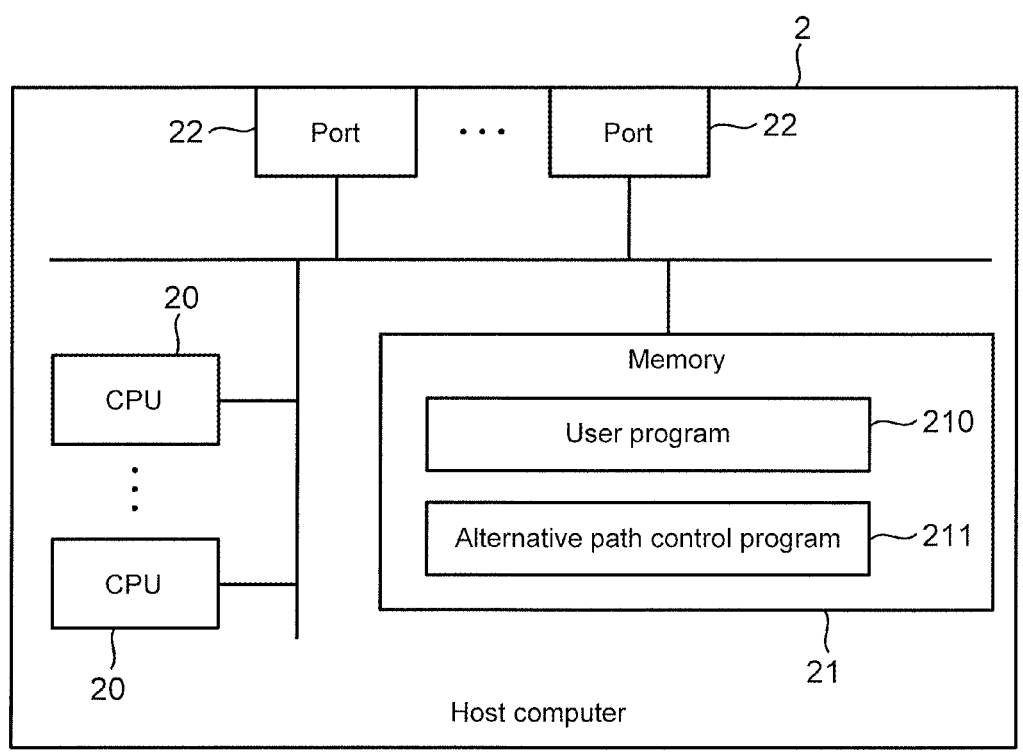
FIG. 2 is a diagram showing a configuration of a host computer.

FIG. 2 is a diagram showing the configuration of the host computer 2. The host computer 2 includes CPUs 20, a memory 21, and ports 22. The CPU 20 is a processor that controls the operation of the host computer 2, executes various programs stored in the memory 21, and issues input and output requests containing the read request or write request to the storage apparatus 3. Hereinafter, the control by the CPU 20 that executes the program stored in the memory 21 is sometimes described in a manner where the program is the subject of the operation.

The memory 21 stores, for example, a user program 210 and an alternative path control program 211, as the programs executed by the CPU 20. This memory is also used as a working memory for the CPU 20. The user program 210 is a program a user installs in the host computer 2 in conformity with the usage of the host computer 2.

The alternative path control program 211 is a program that controls an access path to the logical device 33 provided by the storage apparatus 3, and determines which access path is used to issue the input and output requests among multiple access paths to a single logical device 33 from the host computer 2. In case one or some access paths are unavailable owing to a failure or the like, the alternative path control program 211 issues the input and output requests using another access path. In a case where multiple access paths are available, the alternative path control program 211 alternately uses these access paths, thereby achieving load balance.

Figure 3:
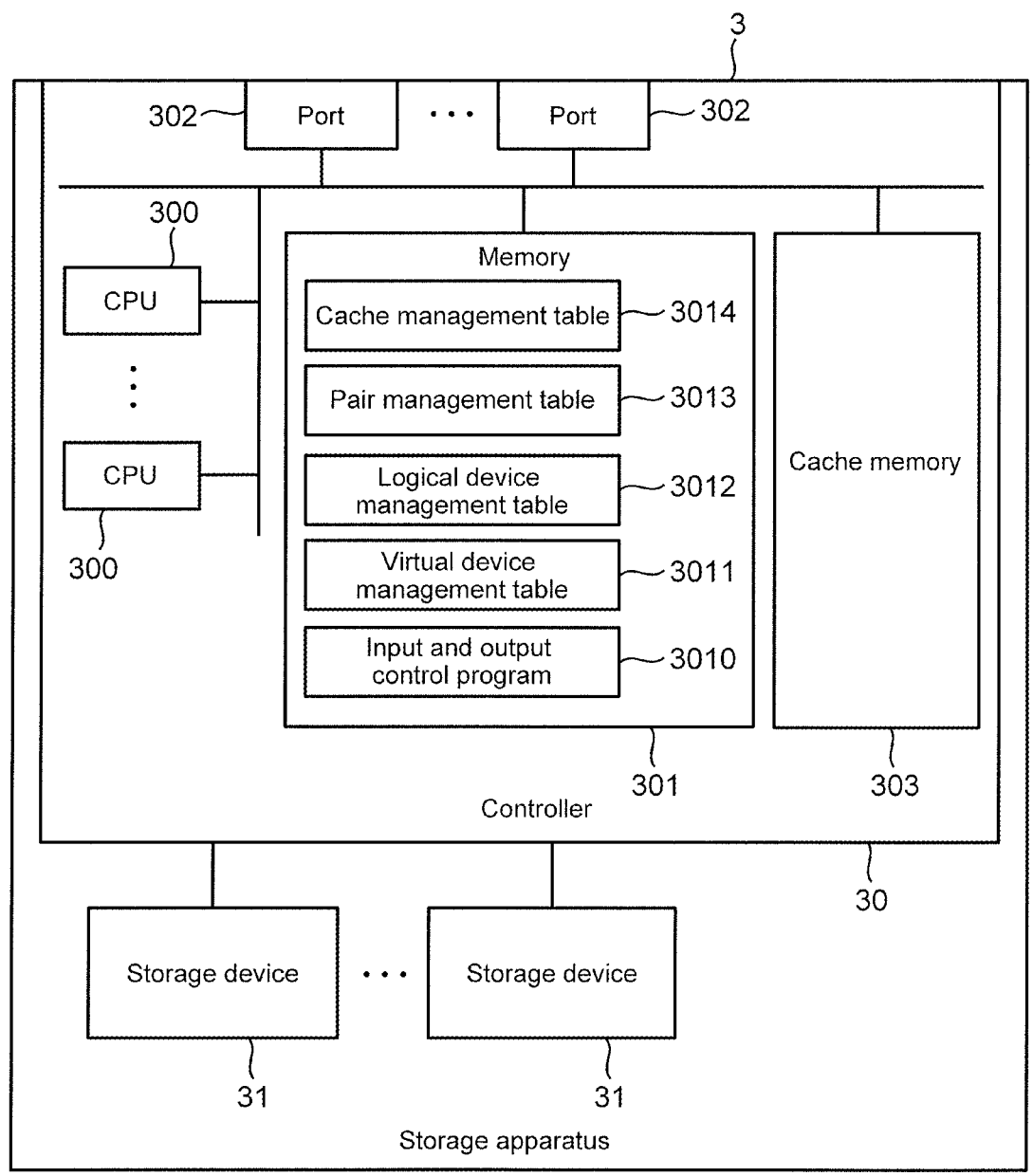
FIG. 3 is a diagram showing a configuration of a storage apparatus.

FIG. 3 is a diagram showing the configuration of the storage apparatus 3. The storage apparatus 3 includes one or more storage devices 31, and a controller 30 that controls data input and output from and to the storage devices 31. The storage device 31 is, for example, a HDD (Hard Disk Drive) or SSD (Solid State Drive).

The controller 30 includes CPUs 300, a memory 301, ports 302, and a cache memory 303. The CPU 300 is a processor that controls the operation of the controller 30, and executes various programs stored in the memory 301. Hereinafter, the control by the CPU 300 that executes the program stored in the memory 301 is sometimes described in a manner where the program is the subject of the operation.

The memory 301 is used to store various programs executed by the CPUs 300, and is also used as a working memory for the CPUs 300. The memory 301 stores, for example, an input and output control program 3010, a virtual device management table 3011, a logical device management table 3012, a pair management table 3013, and a cache management table 3014.

The input and output control program 3010 inputs and outputs data from and to the storage device 31 in response to the input and output requests received from the host computer 2. A storage read process, a storage write process, and a logical device update process in FIGS. 15 to 17, described later, are achieved by the CPUs 300 executing the input and output control program 3010.

The ports 302 are adapters for coupling the storage apparatus 3 to the networks 4. The cache memory 303 is mainly used to store temporarily data exchanged between the host computer 2 and the storage devices 31.

Figure 4:
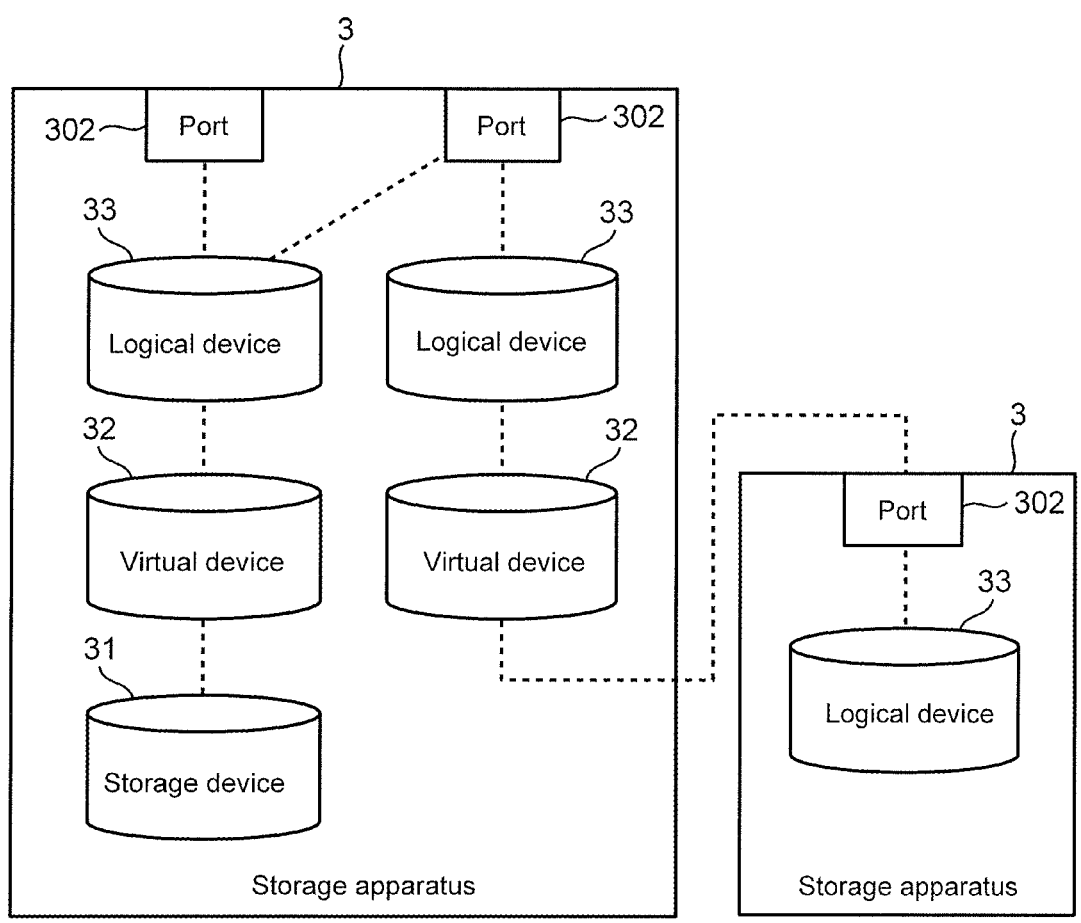
FIG. 4 is a diagram showing configurations of storage areas managed by the storage apparatus.

FIG. 4 is a diagram showing the configuration of storage areas managed by the storage apparatus 3. The storage apparatus 3 uses the virtual device management table 3011 to configure one or more storage areas of the storage device 31 as a RAID (Redundant Array of Inexpensive Disks) group, and manages the group as one or more virtual devices 32. The storage apparatus 3 can manage the logical device 33 of an external storage apparatus 3, instead of the RAID group made up of the storage areas of the storage device 31, as the virtual device 32, using the virtual device management table 3011.

The controller 30 of the storage apparatus 3 manages the storage areas of the one or more virtual devices 32 as one or more logical devices 33, using the logical device management table 3012. The storage apparatus 3 associates a single logical device 33 with one or more ports 302 using the logical device management table 3012, and thus allows this device to be accessible from the host computer 2. The storage apparatus 3 provides the host computer 2 with the storage areas of the one or more logical devices as logical units.

FIG. 5 is a diagram showing the configuration of the virtual device management table 3011 included in the storage apparatus 3. The virtual device management table 3011 records a virtual device number 30110, a device type 30111, a RAID level 30112, a storage device number 30113, an external volume WWN 30114, and an external volume LUN 30115, with respect to each virtual device 32.

The virtual device number 30110 is an identifier that uniquely identifies the virtual device 32 in the storage apparatus 3. The device type 30111 is a value used to identify whether the data provided by the virtual device 32 is present in the RAID group made up of the storage areas of the storage devices 31 in the own storage apparatus 3 or in a logical device of an external storage apparatus 3. In a case where the device type 30111 is "Internal", the data provided by the virtual device 32 is in the RAID group made up of the storage areas of the storage devices 31 in the own storage apparatus 3. On the other hand, in a case where the device type 30111 is "External", the data provided by the virtual device 32 is in a logical device 33 of an external storage apparatus 3.

The RAID level 30112 is a value configured in a case where the device type 30111 is "Internal", and is used to identify a method of adding redundant data through a RAID process. The RAID level 30112 stores, for example, "1" indicating RAID-1 or "5" indicating RAID-5. When the RAID level 30112 is "1" indicating RAID-1, the storage apparatus 3 mirrors data stored in the RAID group to two storage devices 31. When the RAID level 30112 is "5" indicating RAID-5, the storage apparatus 3 calculates one parity for multiple pieces of data stored in the RAID group, and stores the pieces of data and the parity associated therewith in the different storage devices 31.

The storage device number 30113 is a value configured in a case where the device type 30111 is "Internal", and is used to identify uniquely the storage device 31 that stores the data provided by the virtual device 32 in the storage apparatus 3.

The external volume WWN 30114 is a value configured in a case where the device type 30111 is "External", and is the WWN (World Wide Name) of the port 302 with which the logical device 33 of the external storage apparatus 3 is associated.

The external volume LUN (Logical Unit Number) 30115 is a value configured in a case where the device type 30111 is "External", and is used to identify uniquely the logical device 33 accessible through the WWN of the port 302 identified by the external volume WWN 30114.

Figure 6:
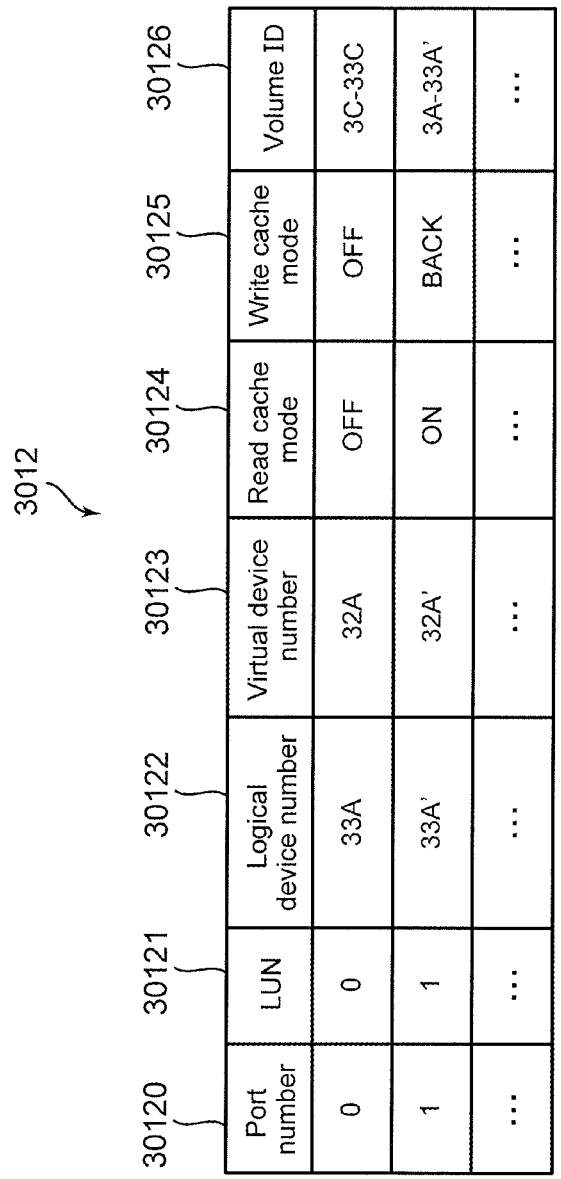
FIG. 6 is a diagram showing a configuration of a logical device management table.

FIG. 6 is a diagram showing the configuration of the logical device management table 3012 included in the storage apparatus 3. The logical device management table 3012 records a port number 30120, an LUN 30121, a logical device number 30122, a virtual device number 30123, a read cache mode 30124, a write cache mode 30125, and a volume ID 30126, with respect to each logical device 33.

The port number 30120 is a number that uniquely identifies the port 302 associated with the logical device 33 in the storage apparatus 3. The LUN 30121 is a value that uniquely identifies the logical device 33 accessible by the host computer 2 through the port 302. The logical device number 30122 is an identifier that uniquely identifies the logical device 33 in the storage apparatus 3. The virtual device number 30123 is an identifier that uniquely identifies the virtual device 32 associated with the logical device 33 in the storage apparatus 3.

The read cache mode 30124 is a value used to determine the operation in a case where the storage apparatus 3 receives a read request issued by the host computer 2, and is "ON" or "OFF".

When the read cache mode 30124 is "ON", the storage apparatus 3 caches read-data according to the read request, in the cache memory 303. When the read-data is in the cache memory 303 upon receipt of the read-request, the storage apparatus 3 transfers the read-data from the cache memory 303 to the host computer 2.

On the other hand, when the read-data is not in the cache memory 303, the storage apparatus 3 reads the read-data from the storage device 31 or an external storage apparatus 3 into the cache memory 303 and subsequently transfers the data from the cache memory 303 to the host computer 2. When the read cache mode 30124 is "ON", the read-data is transferred from the cache memory 303 to the host computer 2 as much as possible, thereby allowing the response time of the read request to be reduced.

On the other hand, when the read cache mode 30124 is "OFF", the storage apparatus 3 does not cache the read-data in the cache memory 303. Upon receipt of the read request, the storage apparatus 3 reads the read-data necessarily from the storage device 31 or an external storage apparatus 3, and transfers the data to the host computer 2. At this time, the cache memory 303 may be used as a buffer memory that temporarily stores the read-data. However, the temporarily stored read-data is not used to respond to the subsequent read request. Thus, the read-data is read necessarily from the storage device 31 or the external storage apparatus 3 and transferred to the host computer 2, thereby allowing the latest data to be transferred to the host computer 2 even in a case where presence of the latest data in the cache memory 303 is not secured.

The write cache mode 30125 is a value used to determine the operation in a case where the storage apparatus 3 receives a write request issued by the host computer 2, and is any of "BACK", "THROUGH" and "OFF".

When the write cache mode 30125 is "BACK", the storage apparatus 3 transmits a completion response to the host computer after writing, in the cache memory 303, write-data to be written according to the write request and before writing write-data (destaging) into a storage device 31 of the own storage apparatus 3 or an external storage apparatus 3. The storage apparatus 3 performs destaging asynchronously to the write request issued from the host computer 2. The destaging asynchronous to the write request can reduce the response time of the write request.

When the write cache mode 30125 is "THROUGH", the storage apparatus 3 completes both writing of the write-data into the cache memory 303 and destaging and subsequently transmits the completion response to the host computer 2. The destaging synchronous with the write request secures that both the data in the cache memory 303 and the data in the storage device 31 or in the external storage apparatus 3 are latest.

When the write cache mode 30125 is "OFF", the storage apparatus 3 does not cache the write-data in the cache memory 303. Upon receipt of the write request, the storage apparatus 3 writes the write-data in the storage device 31 or an external storage apparatus 3 and subsequently transmits a completion response to the host computer 2. At this time, the cache memory 303 may be used as a buffer memory that temporarily stores the write-data. However, the temporarily stored write-data is not used to respond to the subsequent read request. Thus, the write-data is written in the storage device 31 or the external storage apparatus 3 and subsequently the completion response is transmitted to the host computer 2, thereby allowing presence of the latest data in the storage device 31 or the external storage apparatus 3 to be secured.

The volume ID 30126 is information with which the storage apparatus 3 responds to the host computer 2 upon receipt of the Inquiry request (query request) from the host computer 2. The volume ID 30126 contains, for example, the product number of the storage apparatus 3 and the logical device number 30122 of the logical device 33. When the responses to the Inquiry request issued using different access paths are identical to each other, the alternative path control program 211 operating on the host computer 2 determines that these access paths are access paths (alternative paths) to the identical logical device 33.

FIG. 7 is a diagram showing the configuration of a pair management table 3013 that the storage apparatus 3 holds to manage the HA pair of the logical devices 33. The pair management table 3013 records a pair number 30130, a logical device number 30131, a volume attribute 30132, an opposite-party apparatus product number 30133, and an opposite-party logical device number 30134, with respect to each HA pair.

The pair number 30130 is a number that uniquely identifies the HA pair in the storage apparatus 3. The logical device number 30131 is a number that identifies the logical device 33 in the own storage apparatus 3 constituting the HA pair identified by the pair number 30130, uniquely in the own storage apparatus 3.

The volume attribute 30132 is a value used to determine the operation in a case where the storage apparatus 3 receives a write request from the host computer 2, and is "Primary" or "Secondary". The volume attribute 30132 of one logical device 33 of the HA pair is "Primary". The volume attribute 30132 of the other logical device 33 is "Secondary".

In a case where the volume attribute 30132 is "Primary", the storage apparatus 3 updates the logical device 33 in the own storage apparatus 3 identified by the logical device number 30131 upon receipt of a write request. Subsequently, the logical device 33 in the opposite-party storage apparatus 3 with which the updated logical device 33 constitutes the HA pair is updated. The logical device 33 in the opposite-party storage apparatus 3 with which the HA pair is formed is identified by the opposite-party apparatus product number 30133 and the opposite-party logical device number 30134, as described later.

In a case where the volume attribute 30132 is "Secondary", the storage apparatus 3 updates the logical device 33 in the opposite-party storage apparatus 3 with which the logical device 33 in the own storage apparatus 3 forms the HA pair upon receipt of a write request. Subsequently, the logical device 33 in the own storage apparatus 3 identified by the logical device number 30131 is updated.

The opposite-party apparatus product number 30133 is a value that uniquely identifies the opposite-party storage apparatus 3 in which the logical device 33 forming the HA pair with the logical device 33 identified by the logical device number 30131 resides.

The opposite-party logical device number 30134 is a value that identifies the logical device 33 forming the HA pair with the logical device 33 identified by the logical device number 30131, uniquely in the storage apparatus 3 identified by the opposite-party apparatus product number 30133.

FIG. 8 is a diagram showing the configuration of the cache management table 3014 that the storage apparatus 3 holds to manage data stored in the cache memory 303. The cache management table 3014 records a cache address 30140, a logical device number 30141, a LBA (Logical Block Address) 30142, and a data attribute 30143 with respect to each address of the cache memory 303.

The cache address 30140 is information that uniquely identifies the area in the cache memory 303. The logical device number 30141 is a number that identifies which logical device 33 the data stored in the area identified by the cache address 30140 belongs to.

The LBA 30142 is a value that identifies which area in the logical device 33 identified by the logical device number 30141 the data stored in the area identified by the cache address 30140 resides.

The data attribute 30143 is a value that indicates whether or not the data stored in the area identified by the cache address 30140 has been reflected in the storage device 31 or an external storage apparatus 3, and is "Clean" or "Dirty".

In a case where the data attribute 30143 is "Clean", the data stored in the area identified by the cache address 30140 has already been reflected in the storage device 31 or the external storage apparatus 3. Accordingly, the data can be removed from the cache memory 303 without writing (destaging) into the storage device 31 or the external storage apparatus 3.

On the other hand, in a case where the data attribute 30143 is "Dirty", the data stored in the area identified by the cache address 30140 has not been reflected in the storage device 31 or the external storage apparatus 3 yet. Accordingly, in a case of removal from the cache memory 303, destaging is required to be performed beforehand.

Figure 9:
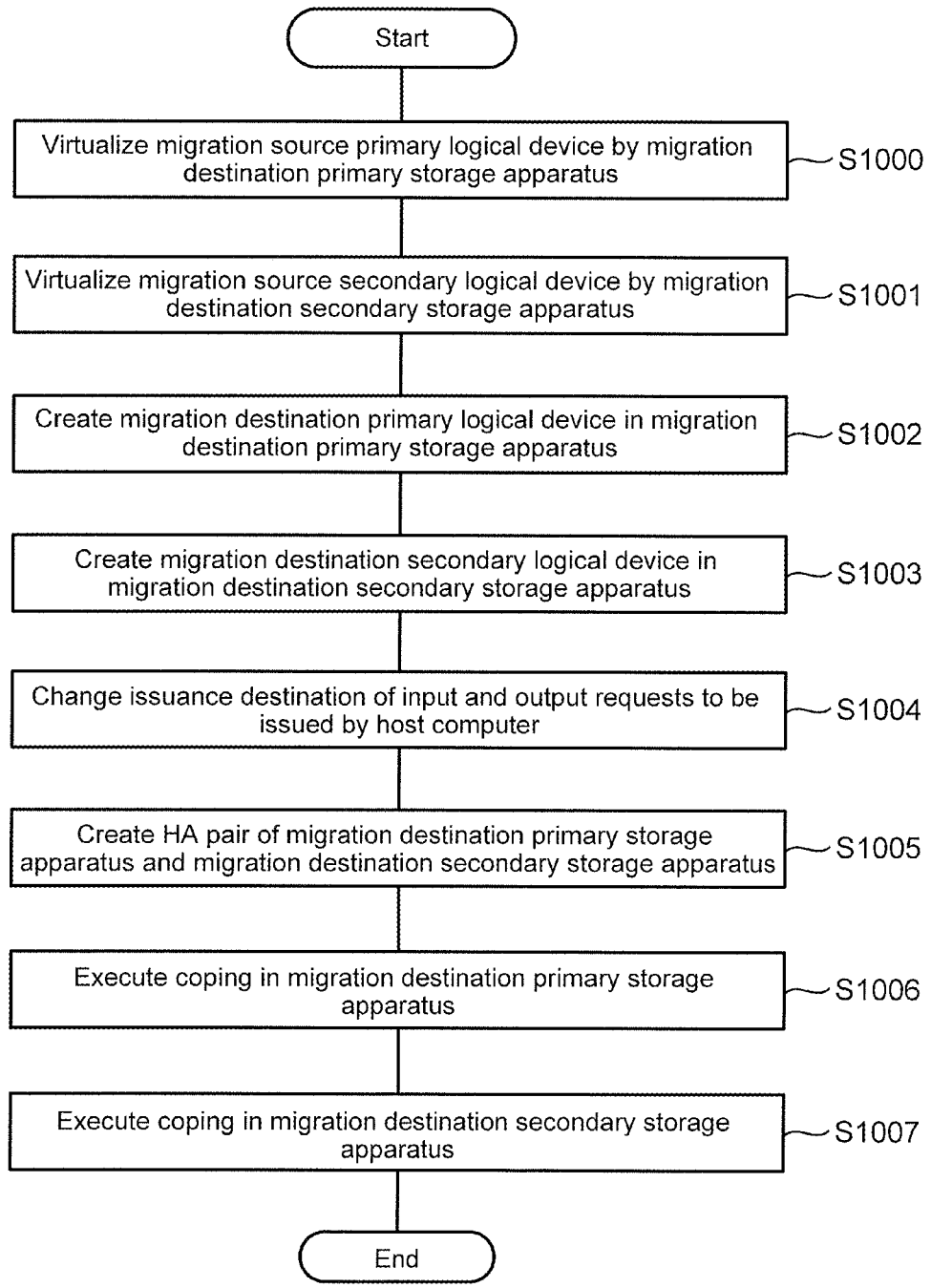
FIG. 9 is a flowchart of a storage migration process.

FIG. 9 is a flowchart of a process to be performed when the HA pair made up of the migration source primary storage apparatus 3C and the migration source secondary storage apparatus 3D is migrated to the migration destination primary storage apparatus 3A and the migration destination secondary storage apparatus 3B (hereinafter a storage migration process). FIGS. 10 to 14 are diagrams showing the states of the computer system before, during and after the storage migration process.

In S1000 of FIG. 9, in response to an instruction from the management apparatus 1, the migration destination primary storage apparatus 3A virtualizes the migration source primary logical device 33C in the migration source primary storage apparatus 3C as a mapping destination primary virtual device 32A. The migration destination primary storage apparatus 3A maps the migration source primary logical device 33C as an external volume to the mapping destination primary virtual device 32A using the virtual device management table 3011 included in the migration destination primary storage apparatus 3A.

At this time, the migration destination primary storage apparatus 3A configures entries whose virtual device number 30110 is a number identifying the mapping destination primary virtual device 32A; that is, this apparatus configures the device type 30111 as "External", the RAID level 30112 as "Undefined", and the storage device number 30113 as "Undefined", in the virtual device management table 3011. The migration destination primary storage apparatus 3A sets the external volume WWN 30114 to the WWN of the port 302 of the migration source primary storage apparatus 3C that provides the migration source primary logical device 33C. The migration destination primary storage apparatus 3A sets the external volume LUN 30115 to the LUN that uniquely identifies the migration source primary logical device 33C.

The migration destination primary storage apparatus 3A creates a mapping destination primary logical device 33A, and associates the mapping destination primary virtual device 32A with the mapping destination primary logical device 33A. More specifically, the migration destination primary storage apparatus 3A configures entries whose logical device number 30122 is a number identifying the mapping destination primary logical device 33A, in the logical device management table 3012 included in the migration destination primary storage apparatus 3A; that is, this apparatus configures the virtual device number 30123 as a number identifying the mapping destination primary virtual device 32A, configures the read cache mode 30124 as "OFF", and configures the write cache mode 30125 as "OFF", in the logical device management table 3012 included in the migration destination primary storage apparatus 3A.

The migration destination primary storage apparatus 3A issues an Inquiry request to the migration source primary storage apparatus 3C, thereby obtaining the volume ID 30126 of the migration source primary logical device 33C in response to the Inquiry request. The migration destination primary storage apparatus 3A configures the volume ID 30126 identical to that of the migration source primary logical device 33C as the volume ID 30126 of the mapping destination primary logical device 33A. Consequently, the migration source primary logical device 33C and the mapping destination primary logical device 33A respond in the same manner to the Inquiry request issued from the host computer 2. The virtualization process described above allows the host computer 2 to recognize the migration source primary logical device 33C and the mapping destination primary logical device 33A as a single virtual logical device.

Next, in response to an instruction from the management apparatus 1, the migration destination secondary storage apparatus 3B virtualizes the migration source secondary logical device 33D in the migration source secondary storage apparatus 3D as a mapping destination secondary virtual device 32B (S1001). The migration destination secondary storage apparatus 3B maps the migration source secondary logical device 33D as an external volume to the mapping destination secondary virtual device 32B using the virtual device management table 3011 included in the migration destination secondary storage apparatus 3B.

The migration destination secondary storage apparatus 3B creates a mapping destination secondary logical device 33B, and associates the mapping destination secondary virtual device 32B with the mapping destination secondary logical device 33B. More specifically, the migration destination secondary storage apparatus 3B updates information pertaining to the mapping destination secondary virtual device 32B in the virtual device management table 3011. Furthermore, the migration destination secondary storage apparatus 3B updates information pertaining to the mapping destination secondary logical device 33B in the logical device management table 3012. A method of updating the virtual device management table 3011 and the logical device management table 3012 is analogous to that in step S1000.

The migration source secondary logical device 33D and the mapping destination secondary logical device 33B respond in the same manner to the Inquiry request issued from the host computer 2. The virtualization process described above allows the host computer 2 to recognize the migration source secondary logical device 33D and the mapping destination secondary logical device 33B as a single virtual logical device.

Next, in response to an instruction from the management apparatus 1, the migration destination primary storage apparatus 3A creates a migration destination primary virtual device 32A' and a migration destination primary logical device 33A' (S1002).

The migration destination primary storage apparatus 3A configures a RAID group made up of the storage areas in one or more migration destination primary storage devices 31A', and manages this group as the migration destination primary virtual device 32A'. The migration destination primary storage apparatus 3A configures entries whose virtual device number 30110 identifies the migration destination primary virtual device 32A', in the virtual device management table 3011 included in the migration destination primary storage apparatus 3A; this apparatus configures the device type 30111 as "Internal", configures the RAID level 30112 as the RAID level used by the migration destination primary virtual device 32A', and configures the storage device number 30113 as a number identifying the migration destination primary storage device 31A' included in the RAID group of the migration destination primary virtual device 32A'. The migration destination primary storage apparatus 3A configures the external volume WWN 30114 and the external volume LUN 30115 as "Undefined".

The migration destination primary storage apparatus 3A associates the migration destination primary virtual device 32A' and the migration destination primary logical device 33A' with each other. More specifically, the migration destination primary storage apparatus 3A configures entries whose logical device number 30122 is a number identifying the migration destination primary logical device 33A', in the logical device management table 3012 included in the migration destination primary storage apparatus 3A; that is, this apparatus configures the virtual device number 30123 as a number identifying the migration destination primary virtual device 32A'.

Next, in response to an instruction from the management apparatus 1, the migration destination secondary storage apparatus 3B creates a migration destination secondary virtual device 32B' and a migration destination secondary logical device 33B' (S1003). The migration destination secondary storage apparatus 3B configures a RAID group made up of the storage areas in one or more migration destination secondary storage devices 31B', and manages this group as the migration destination secondary virtual device 32B'. The migration destination secondary storage apparatus 3B associates the migration destination secondary virtual device 32B' and the migration destination secondary logical device 33B' with each other. As with step S1002, the migration destination secondary storage apparatus 3B updates information pertaining to the migration destination secondary storage device 31B', the migration destination secondary virtual device 32B', and the migration destination secondary logical device 33B', in the virtual device management table 3011 and logical device management table 3012 included in the migration destination secondary storage apparatus 3B.

Next, upon receipt of an instruction from the management apparatus 1, the host computer 2 changes the issuance destination of the input and output requests, from the migration source primary logical device 33C to the mapping destination primary logical device 33A, and from the migration source secondary logical device 33D to the mapping destination secondary logical device 33B (S1004). As described above, the host computer 2 recognizes the migration source primary logical device 33C and the mapping destination primary logical device 33A as the same virtual logical device, and the migration source secondary logical device 33D and the mapping destination secondary logical device 33B as the same virtual logical device. Consequently, the issuance destination of the input and output requests can be changed without stopping the host computer 2, and the configuration of the HA pair of the migration source primary logical device 33C and the migration source secondary logical device 33D can be maintained.

More specifically, upon receipt of an instruction from the management apparatus 1, the alternative path control program 211 of the host computer 2 adds the access path destined for the mapping destination primary logical device 33A, to the list of access paths that are destined for the migration source primary logical device 33C and are managed by the host computer 2, and removes the access path destined for the migration source primary logical device 33C. Consequently, when the user program 210 performs input and output to and from the migration source primary logical device 33C, the input and output requests are issued to the mapping destination primary logical device 33A by means of the access path control by the alternative path control program 211.

The alternative path control program 211 of the host computer 2 may receive an instruction of changing the issuance destination of the input and output requests through a single instruction as an instruction from the management apparatus 1. Alternatively, this program may separately receive an instruction of adding the access path destined for the mapping destination primary logical device 33A, and an instruction of removing the access path destined for the migration source primary logical device 33C.

The alternative path control program 211 of the host computer 2 does not necessarily perform step S1004 upon receipt of the instruction issued from the management apparatus 1. Alternatively, this program may perform step S1004 on the basis of a result of communication with the migration source primary storage apparatus 3C and a result of communication with the migration destination primary storage apparatus 3A. For example, the alternative path control program 211 may issue Inquiry requests to the migration source primary logical device 33C and the mapping destination primary logical device 33A. When responses to the two Inquiry requests coincide with each other, this program may add the access path destined for the mapping destination primary logical device 33A to the managed list of access paths destined for the migration source primary logical device 33C.

The alternative path control program 211 may issue a Report LUNs request to the migration source primary storage apparatus 3C. When the response contains no LUN corresponding to the migration source primary logical device 33C, this program may remove the access path destined for the migration source primary logical device 33C from the managed list of access paths destined for the migration source primary logical device 33C.

As with the method of changing the issuance destination of the input and output requests from the migration source primary logical device 33C into the mapping destination primary logical device 33A, the alternative path control program 211 of the host computer 2 changes the issuance destination of the input and output requests from the migration source secondary logical device 33D into the mapping destination secondary logical device 33B.

Next, the migration destination primary storage apparatus 3A and the migration destination secondary storage apparatus 3B constitute (create) the HA pair made up of the mapping destination primary logical device 33A and the mapping destination secondary logical device 33B (S1005). More specifically, the migration destination primary storage apparatus 3A and the migration destination secondary storage apparatus 3B register information pertaining to the HA pair in the pair management table 3013 held by each apparatus.

The migration destination primary storage apparatus 3A adds an entry corresponding to the HA pair to the pair management table 3013 included in the migration destination primary storage apparatus 3A, and configures the logical device number 30131 as a number identifying the mapping destination primary logical device 33A, configures the volume attribute 30132 as "Primary", configures the opposite-party apparatus product number 30133 as the product number of the migration destination secondary storage apparatus 3B, and configures the opposite-party logical device number 30134 as a number identifying the mapping destination secondary logical device 33B, in this entry.

On the other hand, the migration destination secondary storage apparatus 3B adds an entry corresponding to the HA pair to the pair management table 3013 included in the migration destination secondary storage apparatus 3B, and configures the logical device number 30131 as a number identifying the mapping destination secondary logical device 33B, configures the volume attribute 30132 as "Secondary", configures the opposite-party apparatus product number 30133 as the product number of the migration destination primary storage apparatus 3A, and configures the opposite-party logical device number 30134 as a number identifying the mapping destination primary logical device 33A, in this entry.

According to update of the pair management table 3013, in response to the write request issued from the host computer 2, data written in one element (mapping destination primary logical device 33A) that is of the HA pair and is included in the migration destination primary storage apparatus 3A is also stored in the other element (mapping destination secondary logical device 33B) that is of the HA pair and is included in the migration destination secondary storage apparatus 3B, and the HA pair made up of the migration destination primary storage apparatus 3A and the migration destination secondary storage apparatus 3B holds the same data.

The migration destination primary storage apparatus 3A updates the pair management table 3013, changes, to "ON", the read cache mode 30124 of the entry that is of the logical device management table 3012 included in the migration destination primary storage apparatus 3A and corresponds to the mapping destination primary logical device 33A, and changes the write cache mode 30125 to "THROUGH".

Likewise, the migration destination secondary storage apparatus 3B updates the pair management table 3013, changes, to "ON", the read cache mode 30124 of the entry that is of the logical device management table 3012 included in the migration destination secondary storage apparatus 3B and corresponds to the mapping destination secondary logical device 33B, and changes the write cache mode 30125 to "THROUGH".

Next, in response to an instruction from the management apparatus 1, the migration destination primary storage apparatus 3A copies the data in all the areas of the mapping destination primary logical device 33A to the migration destination primary logical device 33A' (S1006). The data in the migration source primary logical device 33C mapped to the mapping destination primary logical device 33A is transferred from the migration source primary storage apparatus 3C to the migration destination primary storage apparatus 3A, and is stored in the migration destination primary virtual device 32A' associated with the migration destination primary logical device 33A'.

After completion of the copying, the migration destination primary storage apparatus 3A exchanges the mapping destination primary logical device 33A and the virtual device 32 associated with the migration destination primary logical device 33A' for each other. More specifically, the migration destination primary storage apparatus 3A changes the virtual device number 30123 of the entry that is of the logical device management table 3012 and corresponds to the mapping destination primary logical device 33A, to that of the migration destination primary virtual device 32A'. Furthermore, the migration destination primary storage apparatus 3A changes the virtual device number 30123 of the entry that is of the logical device management table 3012 and corresponds to the migration destination primary logical device 33A', to the mapping destination primary virtual device 32A.

The process described above associates the mapping destination primary logical device 33A with the migration destination primary virtual device 32A' where the data in the migration source primary logical device 33C has been copied (migrated). The association allows the mapping destination primary logical device 33A to provide the host computer 2 with the data provided by the migration source primary logical device 33C for the host computer 2.

Furthermore, the migration destination primary storage apparatus 3A exchanges the virtual devices 32 for each other and, at the same time, changes the write cache mode 30125 of the entry that is of the logical device management table 3012 and corresponds to the mapping destination primary logical device 33A to "BACK".

Next, in response to an instruction from the management apparatus 1, the migration destination secondary storage apparatus 3B copies the data in all the areas of the mapping destination secondary logical device 33B to the migration destination secondary logical device 33B' (S1007). The data in the migration source secondary logical device 33D mapped to the mapping destination secondary logical device 33B is transferred from the migration source secondary storage apparatus 3D to the migration destination secondary storage apparatus 3B, and is stored in the migration destination secondary virtual device 32B' associated with the migration destination secondary logical device 33B'.

After completion of the copying, the migration destination secondary storage apparatus 3B exchanges the mapping destination secondary logical device 33B and the virtual device 32 associated with the migration destination secondary logical device 33B' for each other. The method of exchanging the virtual devices 32 is analogous to that in step S1006. The process described above associates the mapping destination secondary logical device 33B with the migration destination secondary virtual device 32B' where the data in the migration source secondary logical device 33D has been copied. The association thus allows the mapping destination secondary logical device 33B to provide the host computer 2 with the data provided by the migration source secondary logical device 33D for the host computer 2.

Furthermore, the migration destination secondary storage apparatus 3B exchanges the virtual devices 32 for each other and, at the same time, changes the write cache mode 30125 of the entry that is of the logical device management table 3012 and corresponds to the mapping destination secondary logical device 33B to "BACK".

In step S1005, the migration destination primary storage apparatus 3A and the migration destination secondary storage apparatus 3B constitute the HA pair (second HA pair) made up of the mapping destination primary logical device 33A and the mapping destination secondary logical device 33B, and subsequently the migration destination primary storage apparatus 3A migrates the data in the migration source primary logical device 33C in the migration source primary storage apparatus 3C to the migration destination primary virtual device 32A', and manages the data as the data in the mapping destination primary logical device 33A (S1006). Next, the migration destination secondary storage apparatus 3B migrates the data in the migration source secondary logical device 33D in the migration source secondary storage apparatus 3D to the migration destination secondary virtual device 32B', and manages the data as the data in the mapping destination secondary logical device 33B (S1007). The process described above migrates the HA pair, from the HA pair (first HA pair) of the migration source primary storage apparatus 3C and the migration source secondary storage apparatus 3D to the HA pair (second HA pair) of the migration destination primary storage apparatus 3A and the migration destination secondary storage apparatus 3B. The orders of the steps S1006 and S1007 may be inverted. Alternatively, steps S1006 and S1007 may be simultaneously performed.

According to this embodiment, even after the migration destination primary storage apparatus 3A and the migration destination secondary storage apparatus 3B constitute the HA pair (second HA pair) in step S1005, the migration source primary storage apparatus 3C and the migration source secondary storage apparatus 3D maintain the HA pair (first HA pair) at least until steps S1006 and S1007 are executed and the HA pair migration is completed. Consequently, for example, even in case the HA pair migration fails, the configuration of the HA pair (first HA pair) of the migration source primary storage apparatus 3C and the migration source secondary storage apparatus 3D can be maintained, thereby allowing the computer system to maintain high availability.

According to this embodiment, not after execution of steps S1006 and S1007, before execution thereof instead, the HA pair (second HA pair) constitutes the migration destination primary storage apparatus 3A and the migration destination secondary storage apparatus 3B in step S1005. As described later, for example, when the migration destination primary storage apparatus 3A or the migration destination secondary storage apparatus 3B receives the read request destined for one logical device of the second HA pair from the host computer 2 during data migration in steps S1006 and S1007, the read-data in the cache memory 303 can be transferred to the host computer 2, and can quickly respond to the read request.

Figure 10:
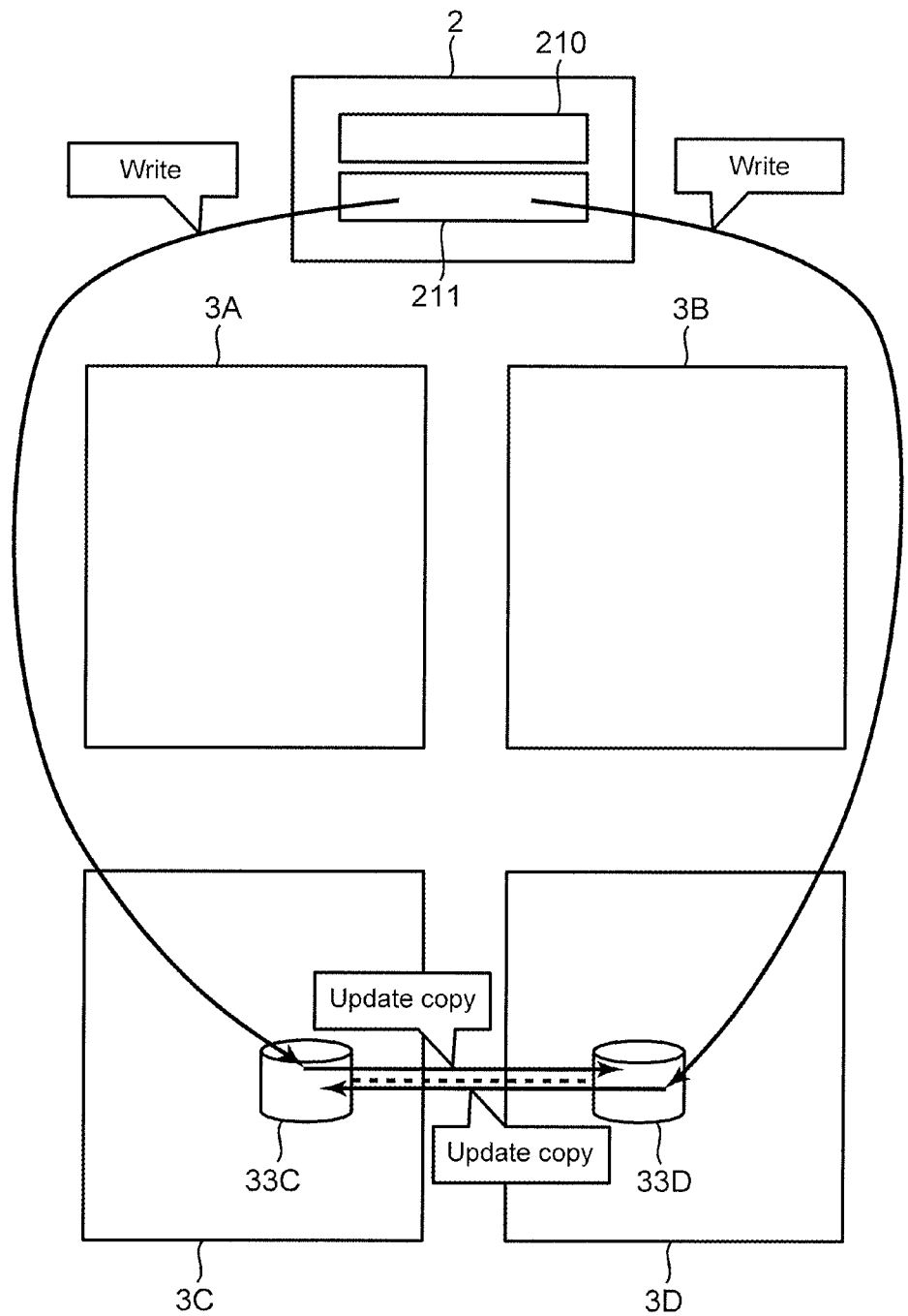
FIG. 10 is a diagram showing the state of the computer system before start of the storage migration process in Embodiment 1.

FIG. 10 is a diagram showing the state of the computer system before start of the storage migration process (before execution of step S1000 in the flowchart of FIG. 9). The migration source primary logical device 33C of the migration source primary storage apparatus 3C and the migration source secondary logical device 3D of the migration source secondary storage apparatus 3D constitute the HA pair. The migration destination primary storage apparatus 3A and the migration destination secondary storage apparatus 3B have not been used yet. In each of the logical device management tables 3012 of the migration source primary storage apparatus 3C and the migration source secondary storage apparatus 3D, each of the read cache modes 30124 of the migration source primary logical device 33C and the migration source secondary logical device 33D is "ON", and each of the write cache modes 30125 is "BACK".

When the user program 210 performs writing or reading to or from the virtual logical device, the host computer 2 issues the input and output requests (write request or read request) to the migration source primary logical device 33C or the migration source secondary logical device 33D by means of access control by the alternative path control program 211.

Upon receipt of the write request issued by the host computer 2 and destined for the migration source primary logical device 33C, the migration source primary storage apparatus 3C updates the migration source primary logical device 33C, and subsequently issues an update copy request containing the write-data to the migration source secondary storage apparatus 3D. The migration source secondary storage apparatus 3D updates the migration source secondary logical device 33D of the HA pair on the basis of the received update copy request.

Upon receipt of the read request issued by the host computer 2 and destined for the migration source primary logical device 33C, the migration source primary storage apparatus 3C responds to the host computer 2 with the read-data in the cache memory 303 of the own apparatus.

Upon receipt of the write request issued by the host computer 2 and destined for the migration source secondary logical device 33D, the migration source secondary storage apparatus 3D issues an update copy request containing the write-data to the migration source primary storage apparatus 3C. The migration source primary storage apparatus 3C updates the migration source primary logical device 33C of the HA pair on the basis of the received update copy request. Subsequently, the migration source secondary storage apparatus 3D updates the migration source secondary logical device 33D on the basis of the write request.

Upon receipt of the read request issued by the host computer 2 and destined for the migration source secondary logical device 33D, the migration source secondary storage apparatus 3D responds to the host computer 2 with the read-data in the cache memory 303 of the own apparatus.

Figure 11:
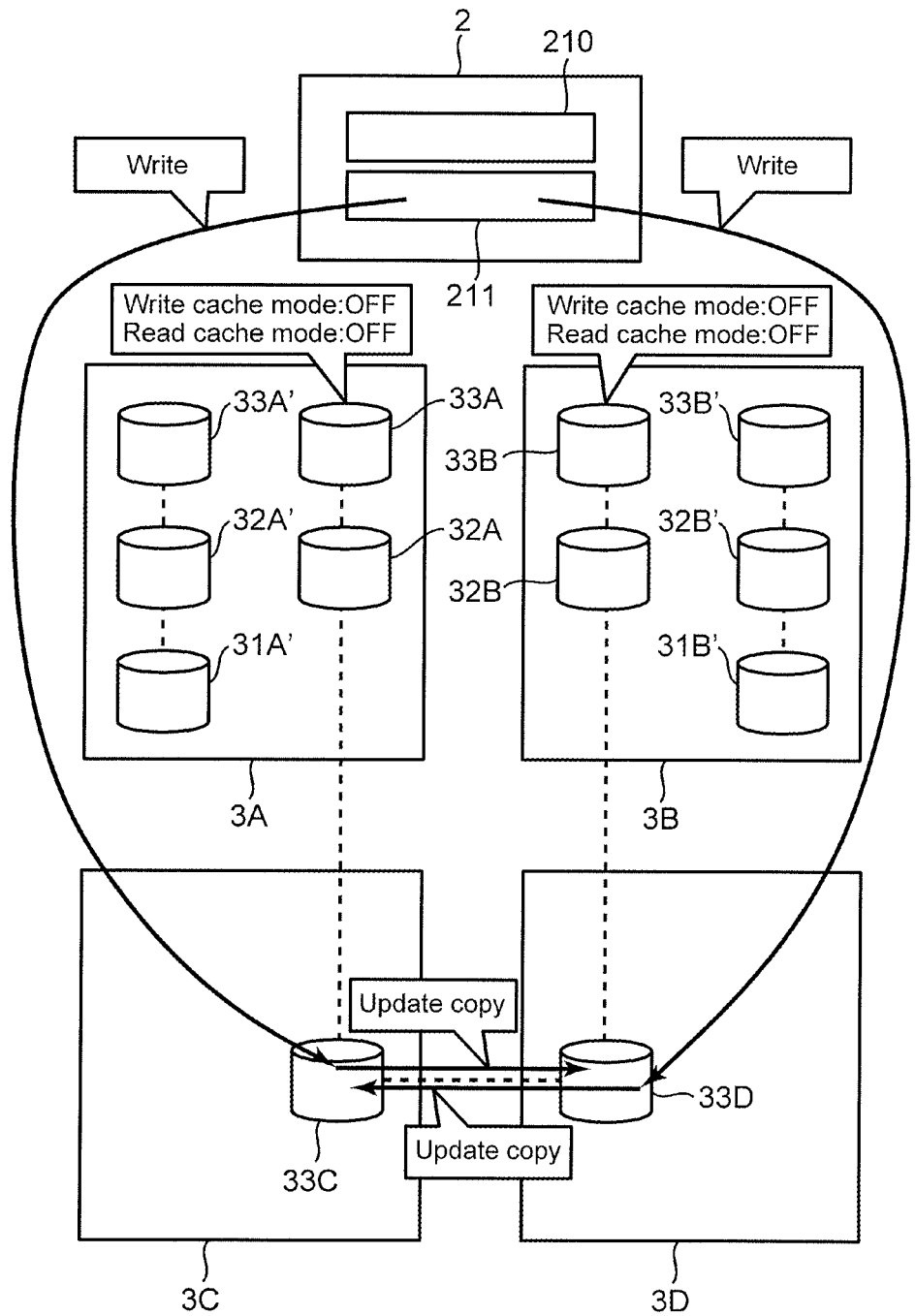
FIG. 11 is a diagram showing the state of the computer system before change of the issuance destination of the input and output requests of the host computer in the storage migration process in Embodiment 1.

FIG. 11 is a diagram showing the state of the computer system after execution of step S1003 in the flowchart of FIG. 9. The migration destination primary storage apparatus 3A and the migration destination secondary storage apparatus 3B virtualize the migration source primary logical device 33C and the migration source secondary logical device 33D, respectively. In the migration destination primary storage apparatus 3A and the migration destination secondary storage apparatus 3B, the migration destination primary logical device 33A' and the migration destination secondary logical device 33B' reside, respectively, but have not been used yet.

The process by the user program 210 of the host computer 2 to perform writing or reading to or from the migration source primary logical device 33C or the migration source secondary logical device 33D is analogous to that in the state in FIG. 10, described above.

Figure 12:
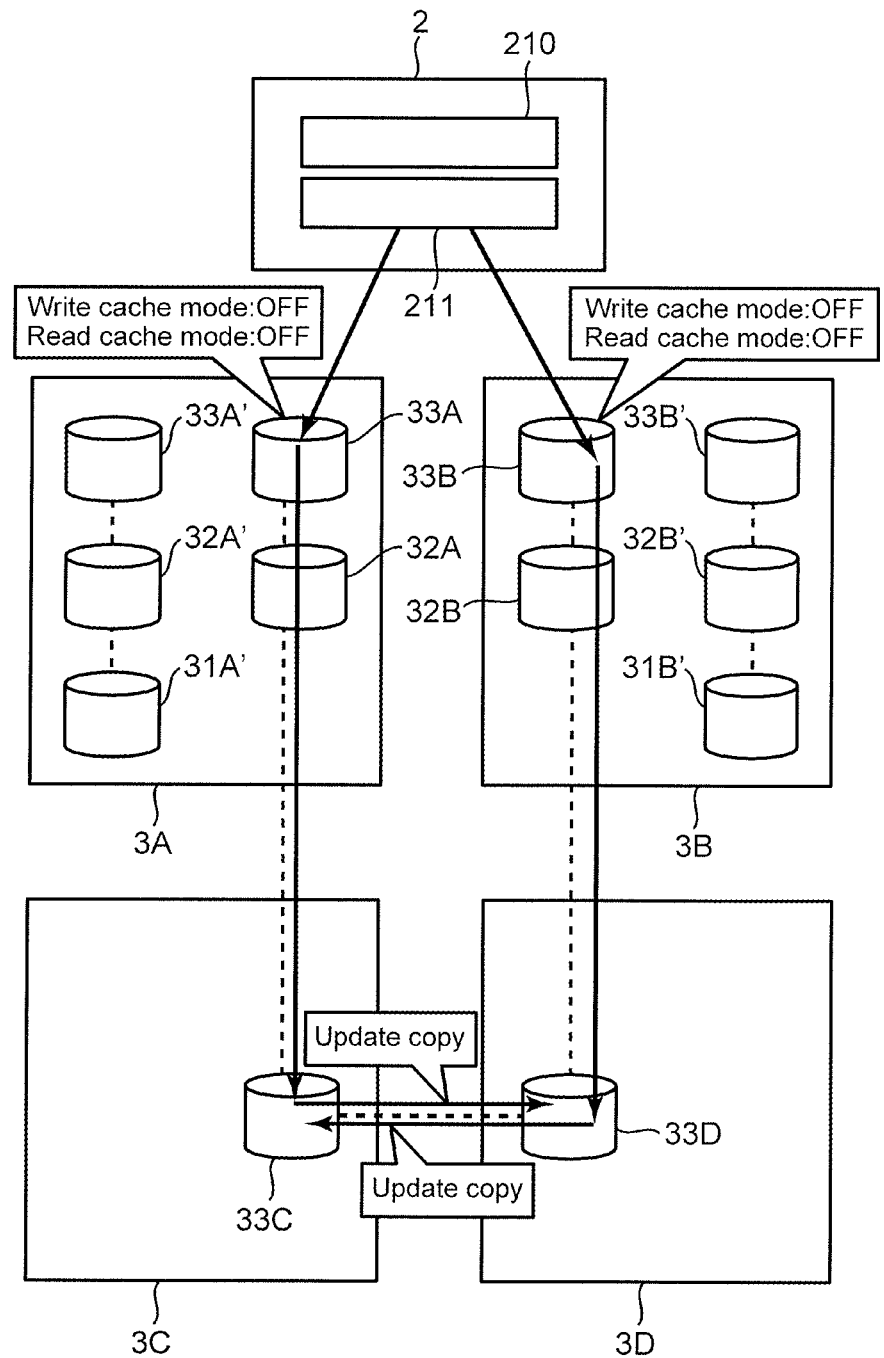
FIG. 12 is a diagram showing the state of the computer system after change of the issuance destination of the input and output requests of the host computer in the storage migration process in Embodiment 1.

FIG. 12 is a diagram showing the state of the computer system after execution of step S1004 in the flowchart of FIG. 9. When the user program 210 performs writing or reading to or from the virtual logical device, the host computer 2 issues the input and output requests (write request or read request) to the mapping destination primary logical device 33A or the mapping destination secondary logical device 33B by means of access control by the alternative path control program 211.

Upon receipt of the write request issued by the host computer 2 and destined for the mapping destination primary logical device 33A, the migration destination primary storage apparatus 3A refers to the logical device management table 3012 and determines that the write cache mode 30125 of the mapping destination primary logical device 33A is "OFF", and the migration destination primary storage apparatus 3A transmits the write request to the migration source primary storage apparatus 3C. In the migration source primary storage apparatus 3C, the volume attribute 30132 of the migration source primary logical device 33C is "Primary". Consequently, this apparatus updates the migration source primary logical device 33C on the basis of the write request. Subsequently, the update copy request containing the write-data is issued to the migration source secondary storage apparatus 3D. The migration source secondary storage apparatus 3D updates the migration source secondary logical device 33D of the HA pair on the basis of the received update copy request. Subsequently, the migration destination primary storage apparatus 3A transmits a completion response to the host computer 2.

Upon receipt of the read request issued by the host computer and destined for the mapping destination primary logical device 33A, the migration destination primary storage apparatus 3A reads the read-data from the migration source primary logical device 33C and transfers the data to the host computer 2 because the read cache mode 30124 of the mapping destination primary logical device 33A is "OFF".

Upon receipt of the write request issued by the host computer 2 and destined for the mapping destination secondary logical device 33B, the migration destination secondary storage apparatus 3B refers to the logical device management table 3012 and determines that the write cache mode 30125 of the mapping destination secondary logical device 33B is "OFF", and the migration destination secondary storage apparatus 3B transmits the write request to the migration source secondary storage apparatus 3D. The migration source secondary storage apparatus 3D issues an update copy request containing the write-data to the migration source primary storage apparatus 3C. The migration source primary storage apparatus 3C updates the migration source primary logical device 33C of the HA pair on the basis of the received update copy request. Subsequently, the migration source secondary storage apparatus 3D updates the migration source secondary logical device 33D on the basis of the write request. Subsequently, the migration destination secondary storage apparatus 3B transmits a completion response to the host computer 2.

Upon receipt of the read request issued by the host computer and destined for the mapping destination secondary logical device 33B, the migration destination secondary storage apparatus 3B reads the read-data from the migration source secondary logical device 33D and transfers the data to the host computer 2 because the read cache mode 30124 of the mapping destination secondary logical device 33B is "OFF".

Figure 13:
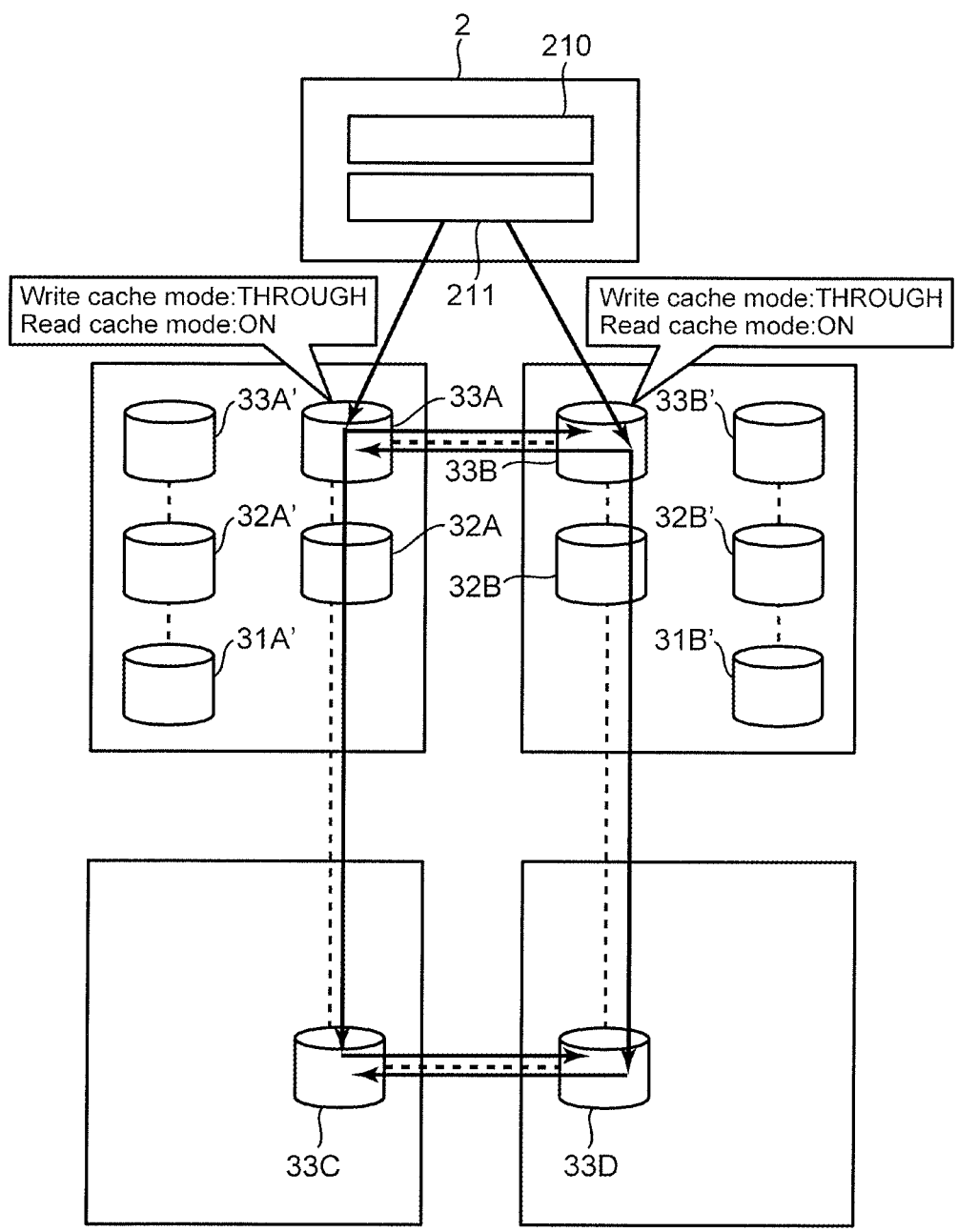
FIG. 13 is a diagram showing the state of the computer system after the HA pair is created with the migration destination primary storage apparatus and the migration destination secondary storage apparatus in the storage migration process in Embodiment 1.

FIG. 13 is a diagram showing the state of the computer system after execution of step S1005 in the flowchart of FIG. 9. The HA pair (first HA pair) is formed between the migration source primary logical device 33C of the migration source primary storage apparatus 3C and the migration source secondary logical device 33D of the migration source secondary storage apparatus 3D. Furthermore, the HA pair (second HA pair) is formed between the mapping destination primary logical device 33A of the migration destination primary storage apparatus 3A and the mapping destination secondary logical device 33B of the migration destination secondary storage apparatus 3B.

Upon receipt of the Inquiry request (query request) issued by the host computer 2, the migration destination primary storage apparatus 3A transmits a response pertaining to the mapping destination primary logical device 33A to the host computer 2. Likewise, upon receipt of the query request issued by the host computer 2, the migration destination secondary storage apparatus 3B transmits a response pertaining to the mapping destination secondary logical device 33B to the host computer. Here, the response pertaining to the mapping destination primary logical device 33A and the response pertaining to the mapping destination secondary logical device 33B are the same as each other. That is, upon receipt of an Inquiry request (query request) from the host computer 2, the migration destination primary storage apparatus 3A and the migration destination secondary storage apparatus 3B respond with the same volume ID 30126 with respect to the mapping destination primary logical device 33A and the mapping destination secondary logical device 33B. Furthermore, the volume ID 30126 is the same as the volume ID 30126 with which the migration source primary storage apparatus 3C and the migration source secondary storage apparatus 3D respond with respect to the migration source primary logical device 33C and the migration source secondary logical device 33D, respectively, upon receipt of an Inquiry request (query request) from the host computer 2 in the state of the computer system before start of the storage migration process shown in FIG. 10.

Consequently, the host computer 2 recognizes the migration source primary logical device 33C and the migration source secondary logical device 33D in the state of FIG. 10 and the mapping destination primary logical device 33A and the mapping destination secondary logical device 33B in the state of FIG. 13, as the same virtual logical device. Consequently, with the host computer 2 not being stopped, the HA pair of the migration source primary storage apparatus 3C and the migration source secondary storage apparatus 3D can be migrated to the HA pair of the migration destination primary storage apparatus 3A and the migration destination secondary storage apparatus 3B.

When the user program 210 performs writing or reading to or from the virtual logical device, the host computer 2 issues the input and output requests (write request or read request) to the mapping destination primary logical device 33A or the mapping destination secondary logical device 33B by means of access control by the alternative path control program 211.

Upon receipt of the write request issued by the host computer 2 and destined for the mapping destination primary logical device 33A, the migration destination primary storage apparatus 3A refers to the logical device management table 3012 and determines that the write cache mode 30125 of the mapping destination primary logical device 33A is "THROUGH", and stores the write-data in the area that is in the cache memory 303 of the own apparatus and is associated with the mapping destination primary logical device 33A. Furthermore, the migration destination primary storage apparatus 3A issues the write request destined for the migration source primary logical device 33C to the migration source primary storage apparatus 3C, thereby destaging the write-data to the migration source primary logical device 33C.

Upon receipt of the write request issued by the migration destination primary storage apparatus 3A, the migration source primary storage apparatus 3C stores the write-data in the area that is in the cache memory 303 of the own apparatus and is associated with the migration source primary logical device 33C because the volume attribute 30132 of the migration source primary logical device 33C is "Primary". Subsequently, the migration source primary storage apparatus 3C issues an update copy request containing the write-data to the migration source secondary logical device 33D of the migration source secondary storage apparatus 3D.

The migration source secondary storage apparatus 3D stores the write-data in the area that is in the cache memory 303 of the own apparatus and is associated with the migration source secondary logical device 33D, on the basis of the received update copy request. Subsequently, the migration source secondary storage apparatus 3D transmits, to the migration source primary storage apparatus 3C, the completion response with respect to the update copy request. The migration source primary storage apparatus 3C transmits, to the migration destination primary storage apparatus 3A, the completion response with respect to the write request.

The migration source primary storage apparatus 3C executes a process of destaging the write-data stored in the cache memory 303 of the own apparatus to the storage device 31 constituting the virtual device 32 associated with the migration source primary logical device 33C, asynchronously to the completion response to the write request. Likewise, the migration source secondary storage apparatus 3D executes a process of destaging the write-data stored in the cache memory 303 of the own apparatus to the storage device 31 constituting the virtual device 32 associated with the migration source secondary logical device 33D, asynchronously to the completion response to the update copy request. The migration source primary storage apparatus 3C issues the completion response to the migration destination primary storage apparatus 3A without waiting for completion of the destaging processes in the migration source primary storage apparatus 3C and the migration source secondary storage apparatus 3D. As a result, the speed of response of the entire computer system to the write request by the host computer can be improved while the HA configuration of the computer system is maintained.

As the volume attribute 30132 of the mapping destination primary logical device 33A is "Primary", the migration destination primary storage apparatus 3A issues (transmits) an update copy request containing write-data to the mapping destination secondary logical device 33B of the migration destination secondary storage apparatus 3B. Upon receipt of the update copy request issued by the migration destination primary storage apparatus 3A, the migration destination secondary storage apparatus 3B stores the write-data in the area that is in the cache memory 303 of the own apparatus and is associated with the mapping destination secondary logical device 33B. The migration destination secondary storage apparatus 3B transmits, to the migration destination primary storage apparatus 3A, the completion response with respect to the update copy request.

Here, as described above, the migration source secondary logical device 33D updates the write-data on the basis of the update copy request issued by the migration source primary storage apparatus 3C. Possible destaging of the write-data by the migration destination secondary storage apparatus 3B to the migration source secondary storage apparatus 3D redundantly updates the migration source secondary logical device 33D. The redundancy increases the processing cost to the write request.

Thus, in this embodiment, in order to prevent the migration source secondary logical device 33D from being redundantly updated, the migration destination secondary storage apparatus 3B performs control so as not to destage the write-data to the migration source secondary logical device 33D even though the write cache mode 30125 of the mapping destination secondary logical device 33B is "THROUGH". That is, the migration destination secondary storage apparatus 3B manages the write-data on the update copy request, as data that is not to be destaged to the migration source secondary logical device 33D of the migration source secondary storage apparatus 3D.

More specifically, when the migration destination secondary storage apparatus 3B registers the write-data to the cache management table 3013, this apparatus sets, to "Clean", the data attribute 30143 of the cache address 30140 of the cache memory 303 for storing the write-data. In the migration destination secondary storage apparatus 3B, during the destaging process performed asynchronously to the write request, destaging is not performed for the area of the cache address 30140 where the data attribute 30143 is "Clean". Consequently, the migration source secondary logical device 33D is not redundantly updated, thereby allowing the processing cost to the write request to be eliminated.

The migration destination primary storage apparatus 3A receives, from the migration destination secondary storage apparatus 3B, the completion response to the update copy request, and subsequently transmits the completion response with respect to the write request to the host computer 2.

Next, upon receipt of the read request issued by the host computer 2 and destined for the mapping destination primary logical device 33A, the migration destination primary storage apparatus 3A transfers data to be read (read-data) from the cache memory 303 of the own apparatus to the host computer 2 when the read-data is present in the cache memory 303 because the read cache mode 30124 of the mapping destination primary logical device 33A is "ON". This case is allowed to respond quickly to the read request, in comparison with the case where the read cache mode 30124 of the mapping destination primary logical device 33A in FIG. 12 is "OFF". On the other hand, when the read-data is not in the cache memory 303 of the migration destination primary storage apparatus 3A, this apparatus reads the read-data from the migration source primary logical device 33C and subsequently transfers the data from the cache memory 303 to the host computer 2.

Upon receipt of the write request issued by the host computer 2 and destined for the mapping destination secondary logical device 33B, the migration destination secondary storage apparatus 3B issues (transmits) an update copy request containing the write-data to the mapping destination primary logical device 33A of the migration destination primary storage apparatus 3A because the volume attribute 30132 of the mapping destination secondary logical device 33B is "Secondary". Upon receipt of the update copy request issued by the migration destination secondary storage apparatus 3B, the migration destination primary storage apparatus 3A stores the write-data in the area that is in the cache memory 303 of the own apparatus and is associated with the mapping destination primary logical device 33A. The migration destination primary storage apparatus 3A transmits, to the migration destination secondary storage apparatus 3B, the completion response with respect to the update copy request.

Here, as described later, the migration source primary logical device 33C updates the write-data on the basis of the update copy request issued by the migration source secondary storage apparatus 3D. Possible destaging of the write-data by the migration destination primary storage apparatus 3A to the migration source primary storage apparatus 3C redundantly updates the migration source primary logical device 33C. The redundancy increases the processing cost to the write request.

Thus, in this embodiment, in order to prevent the migration source primary logical device 33C from being redundantly updated, the migration destination primary storage apparatus 3A performs control so as not to destage the write-data to the migration source primary logical device 33C even though the write cache mode 30125 of the mapping destination primary logical device 33A is "THROUGH". That is, the migration destination primary storage apparatus 3A manages the write-data on the update copy request, as data that is not to be destaged to the migration source secondary logical device 33C of the migration source primary storage apparatus 3C.

More specifically, when the migration destination primary storage apparatus 3A registers the write-data to the cache management table 3013, this apparatus sets, to "Clean", the data attribute 30143 of the cache address 30140 of the cache memory 303 for storing the write-data. In the migration destination primary storage apparatus 3A, during the destaging process performed asynchronously to the write request, destaging is not performed for the area of the cache address 30140 where the data attribute 30143 is "Clean". Consequently, the migration source primary logical device 33C is not redundantly updated, thereby allowing the processing cost to the write request to be eliminated.

After receipt of the completion response to the update copy request, the migration destination secondary storage apparatus 3B refers to the logical device management table 3012 and determines that the write cache mode 30125 of the mapping destination secondary logical device 33B is "THROUGH", and stores the write-data in the area that is in the cache memory 303 of the own apparatus and is associated with the mapping destination secondary logical device 33B. Furthermore, the migration destination secondary storage apparatus 3B issues the write request destined for the migration source secondary logical device 33D to the migration source secondary storage apparatus 3D, thereby destaging the write-data to the migration source secondary logical device 33D.

Upon receipt of the write request issued by the migration destination secondary storage apparatus 3B, the migration source secondary storage apparatus 3D issues an update copy request containing the write-data to the migration source primary logical device 33C of the migration source primary storage apparatus 3C because the volume attribute 30132 of the migration source secondary logical device 33D is "Secondary".

The migration source primary storage apparatus 3C stores the write-data in the area that is in the cache memory 303 of the own apparatus and is associated with the migration source primary logical device 33C, on the basis of the received update copy request. Subsequently, the migration source primary storage apparatus 3C transmits, to the migration source secondary storage apparatus 3D, the completion response with respect to the update copy request.

Subsequently, the migration source secondary storage apparatus 3D stores the write-data in the area that is in the cache memory 303 of the own apparatus and is associated with the migration source secondary logical device 33D. The migration source secondary storage apparatus 3D transmits, to the migration destination secondary storage apparatus 3B, the completion response with respect to the write request. The migration destination secondary storage apparatus 3B transmits, to the host computer 2, a completion response with respect to the write request.

The migration source primary storage apparatus 3C executes a process of destaging the write-data stored in the cache memory 303 of the own apparatus to the storage device 31 constituting the virtual device 32 associated with the migration source primary logical device 33C, asynchronously to the completion response to the update copy request. Likewise, the migration source secondary storage apparatus 3D executes a process of destaging the write-data stored in the cache memory 303 of the own apparatus to the storage device 31 constituting the virtual device 32 associated with the migration source secondary logical device 33D, asynchronously to the completion response to the write request. The migration source secondary storage apparatus 3D issues the completion response to the migration destination secondary storage apparatus 3B without waiting for completion of the destaging processes in the migration source primary storage apparatus 3C and the migration source secondary storage apparatus 3D. As a result, the speed of response of the entire computer system to the write request by the host computer 2 can be improved while the HA configuration of the computer system is maintained.

Upon receipt of the read request issued by the host computer and destined for the mapping destination secondary logical device 33B, the migration destination secondary storage apparatus 3B transfers the read-data from the cache memory 303 to the host computer 2 when the read-data is present in the cache memory 303 of the own apparatus because the read cache mode 30124 of the mapping destination secondary logical device 33B is "ON". This case is allowed to respond quickly to the read request, in comparison with the case where the read cache mode 30124 of the mapping destination secondary logical device 33B in FIG. 12 is "OFF".

On the other hand, when the read-data is not in the cache memory 303 of the migration destination secondary storage apparatus 3B, this apparatus reads the read-data from the migration source secondary logical device 33D and subsequently transfers the data from the cache memory 303 to the host computer 2.

Referring to FIG. 13, the states where steps S1006 and S1007 are in execution in the flowchart of FIG. 9 are described. The process by the host computer 2 performing reading from the mapping destination primary logical device 33A or the mapping destination secondary logical device 33B is analogous to the process described with reference to FIG. 13.

When the host computer 2 performs writing to the mapping destination primary logical device 33A or the mapping destination secondary logical device 33B, the following process is executed in addition to the process described above with respect to FIG. 13.

In step S1006, when the migration destination primary storage apparatus 3A copies the data in the mapping destination primary logical device 33A to the migration destination primary logical device 33A', the migration destination primary storage apparatus 3A, upon receipt of the write request issued by the host computer 2 and destined for the mapping destination primary logical device 33A, updates not only the cache memory 303, the migration source primary logical device 33C and the mapping destination secondary logical device 33B but also the migration destination primary logical device 33A', and subsequently transmits, to the host computer 2, the completion response with respect to the write request.

Upon receipt of the update copy request issued by the migration destination secondary storage apparatus 3B and destined for the mapping destination primary logical device 33A, the migration destination primary storage apparatus 3A updates not only the cache memory 303 but also the migration destination primary logical device 33A' and subsequently transmits, to the migration destination secondary storage apparatus 3B, the completion response to the update copy request.

Such update of the migration destination primary logical device 33A' upon receipt of the write request or the update copy request prevents the mapping destination primary logical device 33A and the migration destination primary logical device 33A' from not coinciding with each other after completion of entire-area copy from the mapping destination primary logical device 33A to the migration destination primary logical device 33A'.

When the migration destination secondary storage apparatus 3B copies the data in the mapping destination secondary logical device 33B to the migration destination secondary logical device 33B' in step S1007, a process analogous to the process described above is performed to update the migration destination secondary logical device 33B' upon receipt of the write request or the update copy request destined for the mapping destination secondary logical device 33B. The migration destination secondary storage apparatus 3B updates the migration destination secondary logical device 33B' and subsequently transmits the completion response to the write request or the update copy request.

Figure 14:
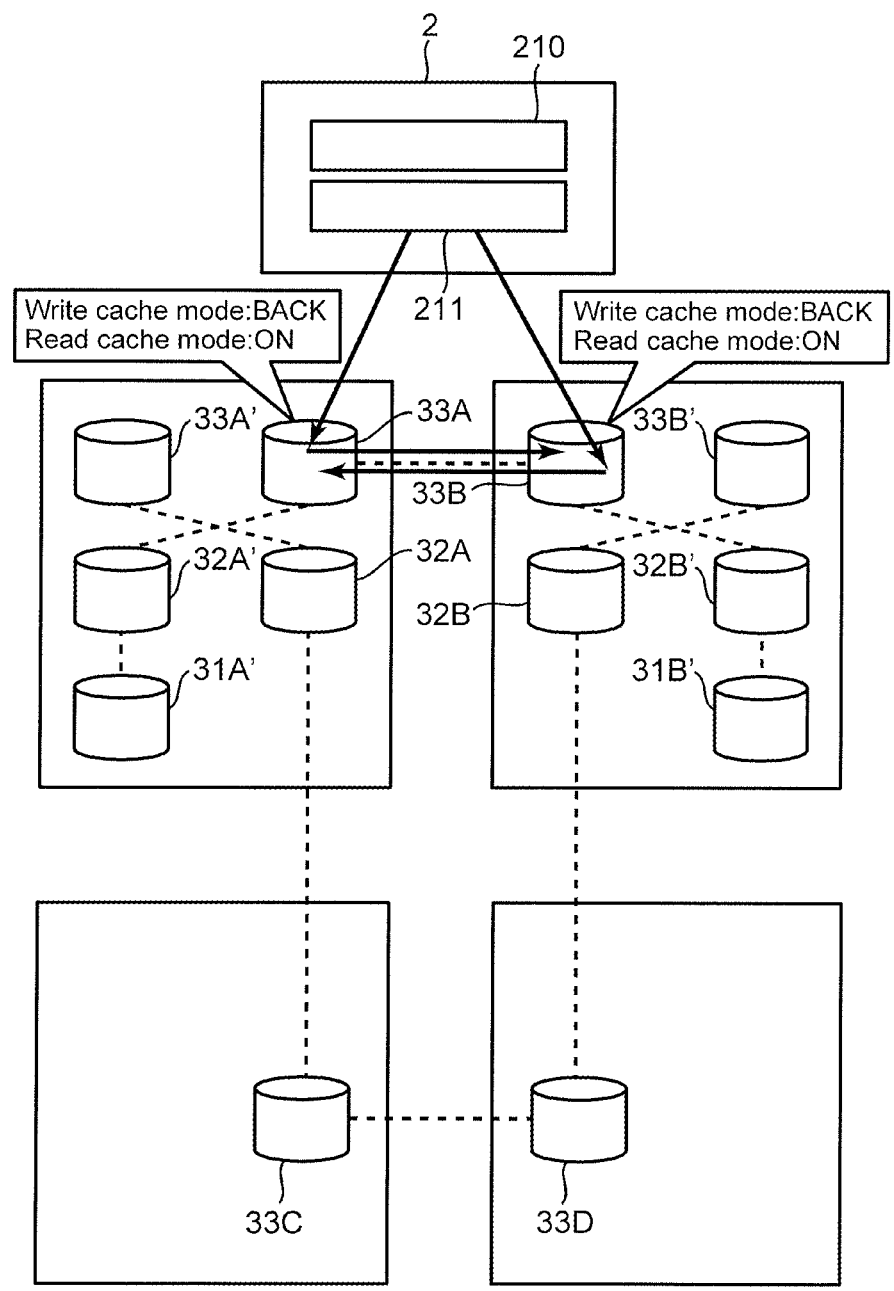
FIG. 14 is a diagram showing the state of the computer system after completion of the storage migration process in Embodiment 1.

FIG. 14 is a diagram showing the state of the computer system after completion of the storage migration process (after execution of step S1007 in the flowchart of FIG. 9). The HA pair is formed between the mapping destination primary logical device 33A of the migration destination primary storage apparatus 3A and the mapping destination secondary logical device 33B of the migration destination secondary storage apparatus 3B.

When the user program 210 performs writing or reading to or from the virtual logical device, the host computer 2 issues the input and output requests (write request or read request) to the mapping destination primary logical device 33A or the mapping destination secondary logical device 33B by means of access control by the alternative path control program 211. At this time, the migration source primary storage apparatus 3C and the migration source secondary storage apparatus 3D are not used.

In the migration destination primary storage apparatus 3A, the migration destination primary logical device 33A' and the mapping destination primary virtual device 32A may be removed. In the virtual device management table 3011 and the logical device management table 3012, information pertaining to the migration destination primary logical device 33A' and the mapping destination primary virtual device 32A may be updated (removed). Likewise, in the migration destination secondary storage apparatus 3B, the migration destination secondary logical device 33B' and the mapping destination secondary virtual device 32B may be removed. In the virtual device management table 3011 and the logical device management table 3012, information pertaining to the migration destination secondary logical device 33B' and the mapping destination secondary virtual device 32B may be updated (removed).

As described above, the migration source primary storage apparatus 3C and the migration source secondary storage apparatus 3D are not used. Consequently, the migration source primary storage apparatus 3C and the migration source secondary storage apparatus 3D can be eliminated. That is, the computer system of this embodiment can replace the migration source primary storage apparatus 3C and the migration source secondary storage apparatus 3D having the HA pair with the migration destination primary storage apparatus 3A and the migration destination secondary storage apparatus 3B, respectively, while maintaining the HA configuration.

Upon receipt of the write request issued by the host computer 2 and destined for the mapping destination primary logical device 33A, the migration destination primary storage apparatus 3A stores the write-data in the area that is in the cache memory 303 of the own apparatus and is associated with the mapping destination primary logical device 33A because the write cache mode 30125 of the mapping destination primary logical device 33A is "BACK". The migration destination primary storage apparatus 3A issues an update copy request containing the write-data to the mapping destination secondary logical device 33B of the migration destination secondary storage apparatus 3B. The migration destination secondary storage apparatus 3B stores the write-data in the area that is in the cache memory 303 of the own apparatus and is associated with the mapping destination secondary logical device 33B, on the basis of the received update copy request. Before destaging of the write-data to the migration destination primary storage device 31A', the migration destination primary storage apparatus 3A transmits the completion response to the host computer 2.

Upon receipt of the read request issued by the host computer and destined for the mapping destination primary logical device 33A, the migration destination primary storage apparatus 3A transfers the read-data from the cache memory 303 to the host computer 2 when the read-data is present in the cache memory 303 of the own apparatus because the read cache mode 30124 of the mapping destination primary logical device 33A is "ON". On the other hand, when the read-data is not in the cache memory 303 of the migration destination primary storage apparatus 3A, this apparatus reads the read-data from the migration destination primary storage device 31A' and subsequently transfers the data from the cache memory 303 to the host computer 2.

Upon receipt of the write request issued by the host computer 2 and destined for the mapping destination secondary logical device 33B, the migration destination secondary storage apparatus 3B issues the update copy request containing the write-data to the mapping destination primary logical device 33A of the migration destination primary storage apparatus 3A on the basis of the write request. The migration destination primary storage apparatus 3A stores the write-data in the area that is in the cache memory 303 of the own apparatus and is associated with the mapping destination primary logical device 33A, on the basis of the received update copy request. Subsequently, as the write cache mode 30125 of the mapping destination secondary logical device 33B is "BACK", the migration destination secondary storage apparatus 3B stores the write-data in the area that is in the cache memory 303 of the own apparatus and is associated with the mapping destination secondary logical device 33B. Before destaging of the write-data to the migration destination secondary storage device 31B', the migration destination secondary storage apparatus 3B transmits the completion response to the host computer 2.

Upon receipt of the read request issued by the host computer and destined for the mapping destination secondary logical device 33B, the migration destination secondary storage apparatus 3B transfers the read-data from the cache memory 303 to the host computer 2 when the read-data is present in the cache memory 303 of the own apparatus because the read cache mode 30124 of the mapping destination secondary logical device 33B is "ON". On the other hand, when the read-data is not in the cache memory 303 of the migration destination secondary storage apparatus 3B, this apparatus reads the read-data from the migration destination secondary storage device 31B' and subsequently transfers the data from the cache memory 303 to the host computer 2.

Figure 15:
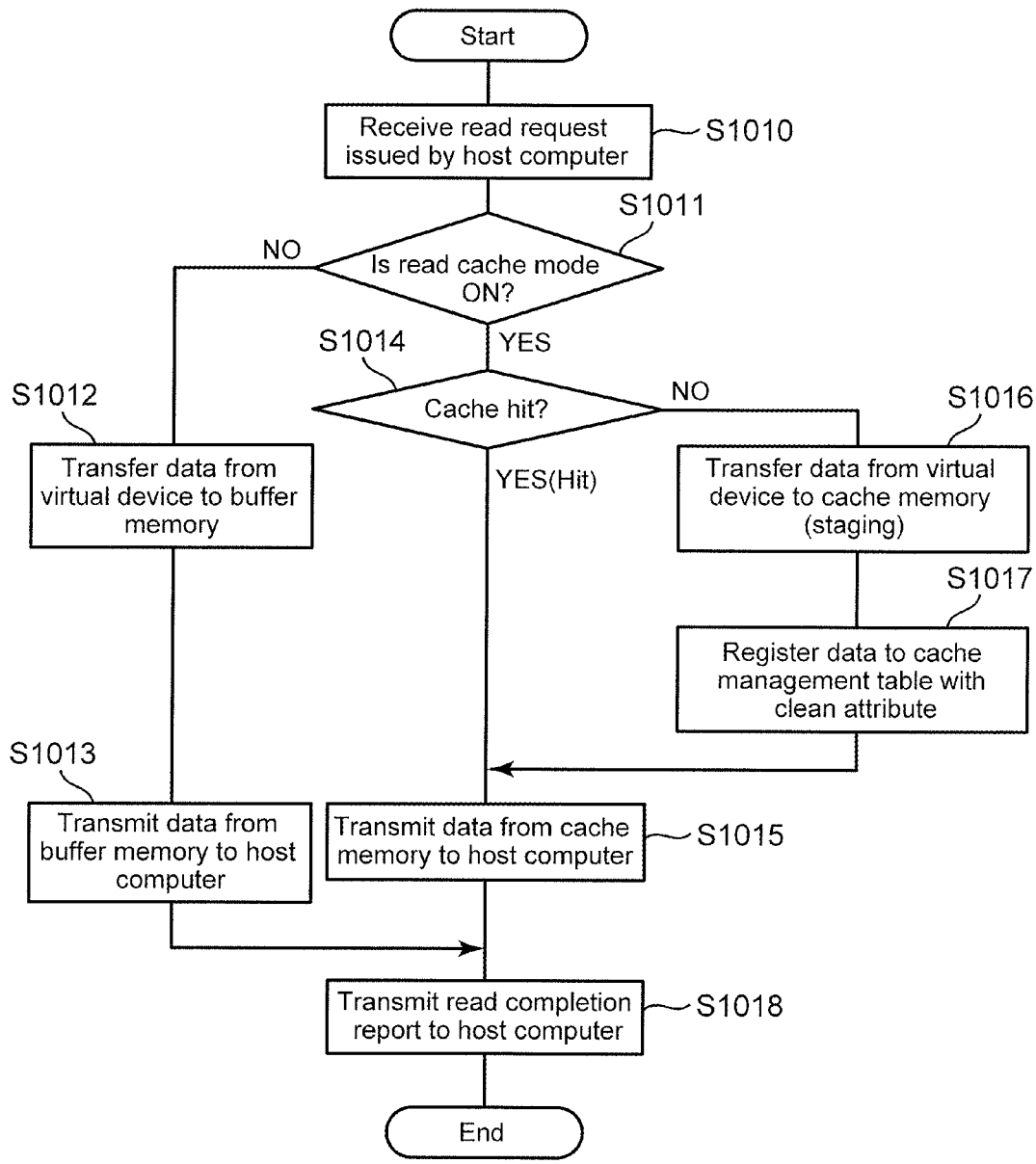
FIG. 15 is a flowchart of a storage read process.

FIG. 15 is a flowchart of a process (hereinafter the storage read process) to be performed by the storage apparatus 3 upon receipt of the read request issued by the host computer 2. The storage apparatus 3 receives the read request issued by the host computer 2 (S1010). Next, the storage apparatus 3 determines whether or not the read cache mode 30124 of the read-destination logical device 33 is "ON" (S1011).

When the storage apparatus 3 receives an affirmative result according to this determination (S1011: YES), the processing proceeds to step S1014. At this time, the storage apparatus 3 determines whether the cache is hit or missed. More specifically, the storage apparatus 3 refers to the cache management table 3014, and determines presence or absence of an entry having the read-destination logical device 30141 and LBA 30142.

When the storage apparatus 3 receives an affirmative result according to this determination (S1014: YES), the processing proceeds to step S1015. At this time, the storage apparatus 3 obtains the read-data from the cache memory 303, and transmits the data to the host computer 2 (S1015).

Next, the storage apparatus 3 transmits, to the host computer 2, a completion report with respect to the read request (S1018), and finishes the storage read process.

On the other hand, when the storage apparatus 3 receives a negative result according to the determination in step S1011 (S1011: NO), the processing proceeds to step S1012. At this time, the storage apparatus 3 transfers the read-data from the virtual device 32 associated with the read-destination logical device 33 to the buffer memory. The buffer memory is, for example, an area that is in the cache memory 303 of the storage apparatus 3 and is not used as a cache.

As to the method of transferring from the virtual device to the buffer memory or the cache memory 303 in S1012 or S1016, when the device type 30111 of the entry that is in the virtual device management table 3011 and corresponds to the virtual device 32 is "Internal", the read-data is obtained from the storage device 31 in the storage apparatus 3 and is transferred. On the other hand, when the device type 30111 of the entry that is in the virtual device management table 3011 and corresponds to the virtual device 32 is "External", the read-data is obtained from the external storage apparatus 3 and is transferred.

Next, the storage apparatus 3 transfers the read-data from the buffer memory to the host computer 2 (S1013). The storage apparatus 3 performs the process in step S1018.

On the other hand, when the storage apparatus 3 receives a negative result according to the determination in step S1014 (S1014: NO), the processing proceeds to step S1016. At this time, the storage apparatus 3 transfers the read-data from the virtual device 32 associated with the read-destination logical device 33 to the cache memory 303.

Next, the storage apparatus 3 registers the read-data in the cache management table 3014 so that the read-data can be transferred from the cache memory 303 to the host computer 2 according to the subsequent read-data (S1017). At this time, the data attribute 30143 is registered as "Clean". Next, the storage apparatus 3 advances the processing to step S1015 described above.

Figure 16:
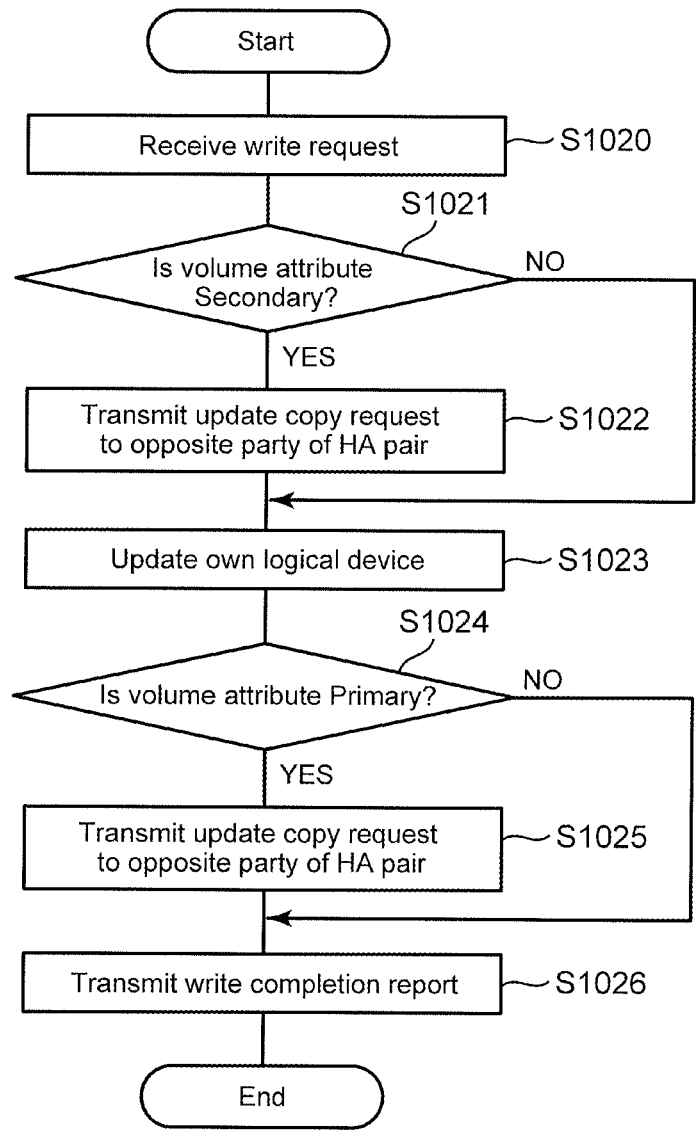
FIG. 16 is a flowchart of a storage write process.

FIG. 16 is a flowchart of a process (hereinafter the storage write process) to be performed by the storage apparatus 3 upon receipt of the write request issued by the host computer 2. The storage apparatus 3 receives the write request issued by the host computer 2 (S1020). Next, the storage apparatus 3 determines whether the volume attribute 30132 of the write-destination logical device 33 is "Secondary" or not (S1021).

When the storage apparatus 3 receives an affirmative result according to this determination (S1021: YES), the processing proceeds to step S1022. The storage apparatus 3 transmits the update copy request to the logical device 33 that is the opposite-party logical device 33 of the HA pair (S1022). As to the specific processes in S1022 and S1025, the storage apparatus refers to the pair management table 3013, and transmits the update copy request to the logical device 33 identified by the opposite-party logical device number 30134 of the storage apparatus 3 identified by the opposite-party apparatus product number 30133 of the entry corresponding to the write-destination logical device 33.

Next, the storage apparatus 3 updates the own logical device (S1023). The details of update of the own logical device 33 are described using the flowchart of FIG. 17.

Next, the storage apparatus 3 determines whether the volume attribute 30132 of the write-destination logical device 33 is "Primary" or not (S1024).

When the storage apparatus 3 receives an affirmative result according to this determination (S1024: YES), the processing proceeds to step S1025. The storage apparatus 3 transmits the update copy request to the logical device 33 that is the opposite-party logical device 33 of the HA pair (S1025).

Next, the storage apparatus 3 transmits, to the host computer 2, a completion report with respect to the write request (S1026), and finishes the storage write process.

On the other hand, when the storage apparatus 3 receives a negative result according to the determination in step S1021 (S1021: NO), the processing proceeds to step S1023.

On the other hand, when the storage apparatus 3 receives a negative result according to the determination in step S1024 (S1024: NO), the processing proceeds to step S1026.

Figure 17:
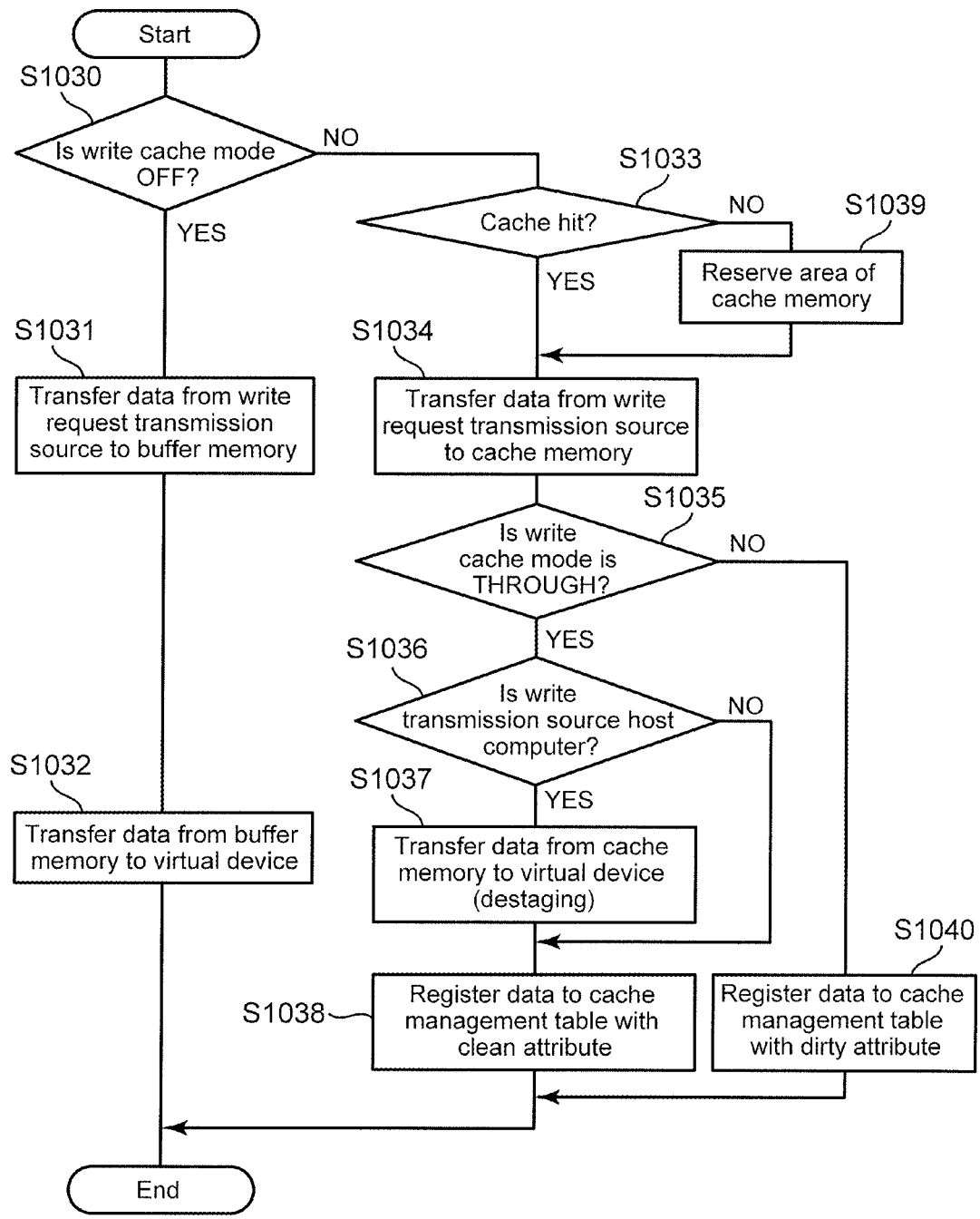
FIG. 17 is a flowchart of a logical device update process.

FIG. 17 is a flowchart of a process (hereinafter a logical device update process) to be executed when the storage apparatus updates the logical device 33 in the own apparatus. The storage apparatus 3 determines whether or not the write cache mode 30125 of the write-destination logical device 33 is "OFF" (S1030).

When the storage apparatus 3 receives an affirmative result according to this determination (S1030: YES), the processing proceeds to step S1031. The storage apparatus 3 transfers the write-data from the write request transmission source to the buffer memory (S1031). The write request transmission source is the host computer 2 or another storage apparatus 3.

Next, the storage apparatus 3 transfers the write-data from the buffer memory to the virtual device 32 associated with the logical device 33 corresponding to the write-data (S1032). As to the specific process in S1032 or S1037, when the device type 30111 of the entry that is in the virtual device management table 3011 and corresponds to the virtual device 32 is "Internal", the storage apparatus 3 stores the write-data in the storage device 31 in the storage apparatus 3. On the other hand, when the device type 30111 of the entry that is in the virtual device management table 3011 and corresponds to the virtual device 32 is "External", the storage apparatus 3 transfers the write-data to the external storage apparatus 3.

After completion of step S1032, the storage apparatus 3 finishes the logical device update process.

On the other hand, when the storage apparatus 3 receives a negative result according to the determination in step S1030 (S1030: NO), the processing proceeds to step S1033. At this time, the storage apparatus 3 determines whether the cache is hit or missed (S1033). More specifically, the storage apparatus 3 refers to the cache management table 3014, and determines presence or absence of an entry having the logical device 30141 and LBA 30142 corresponding to the write-data.

When the storage apparatus 3 receives an affirmative result according to this determination (S1033: YES), the processing proceeds to step S1034. The storage apparatus 3 transfers the write-data from the write request transmission source to the cache memory 303 (S1034). The write request transmission source is the host computer 2 or another storage apparatus 3.

Next, the storage apparatus 3 determines whether or not the write cache mode 30125 of the write-destination logical device 33 is "THROUGH" (S1035). When the storage apparatus 3 receives an affirmative result according to this determination (S1035: YES), the processing proceeds to step S1036. At this time, the storage apparatus 3 determines whether the transmission source of the write request is the host computer 2 or not.

When the storage apparatus 3 receives an affirmative result according to this determination (S1036: YES), the processing proceeds to step S1037. The storage apparatus 3 transfers (destages) the write-data from the cache memory 303 to the virtual device 32 associated with the logical device 33 corresponding to the write-data (S1037).

Next, the storage apparatus 3 registers the write-data in the cache management table 3014. At this time, the data attribute 30143 is registered as "Clean".

After completion of step S1038, the storage apparatus 3 finishes the logical device update process.

On the other hand, when the storage apparatus 3 receives a negative result according to the determination in step S1033 (S1033: NO), the processing proceeds to step S1039. The storage apparatus 3 reserves an area for storing the write-data in the cache memory 303 (S1039). More specifically, the storage apparatus 3 newly adds an entry to the cache management table 3014. The storage apparatus 3 configures the cache address 30140 in the entry to be added, to have a value to identify the area that is in the cache memory 303 and is not used by another entry. Furthermore, the storage apparatus 3 configures the logical device number 30141 in the entry to be added, as the number identifying the write-destination logical device 33, and configures the LBA 30142 as the write-destination LBA. Next, the storage apparatus 3 advances the processing to step S1034.

On the other hand, when the storage apparatus 3 receives a negative result according to the determination in step S1035 (S1035: NO), the processing proceeds to step S1040. As the negative result is obtained, the write cache mode 30125 is "BACK". At this time, the storage apparatus 3 registers the data attribute 30143 with respect to the write-data, as "Dirty", in the cache management table 3014.

After completion of step S1040, the storage apparatus 3 finishes the logical device update process. When the storage apparatus 3 receives a negative result according to the determination in step S1036 (S1036: NO), the processing proceeds to step S1038.

Embodiment 2

Configuration elements analogous to those in Embodiment 1 are assigned the same signs. The description thereof is omitted. Hereinafter, points different from those in Embodiment 1 are described. The other configuration elements are analogous to those in Embodiment 1. For example, the configuration of the computer system in Embodiment 1 shown in FIGS. 2 to 8, the storage read process in FIG. 15, the storage write process in FIG. 16 and the logical device update process in FIG. 17, which are executed by the storage apparatus 3, are also applicable to a computer system in this embodiment.

In Embodiment 1, the case has been described where the HA pair in the two storage apparatuses 3 forming the HA configuration is migrated to the different two storage apparatuses 3. In this embodiment, a case is described where as to the HA pair in the two storage apparatuses 3 forming an HA configuration, the logical device 33 that is one element of the HA pair is migrated to a different storage apparatus 3 while the logical device 33 that is the other element of the HA pair is migrated within the identical storage apparatus.

Figure 18:
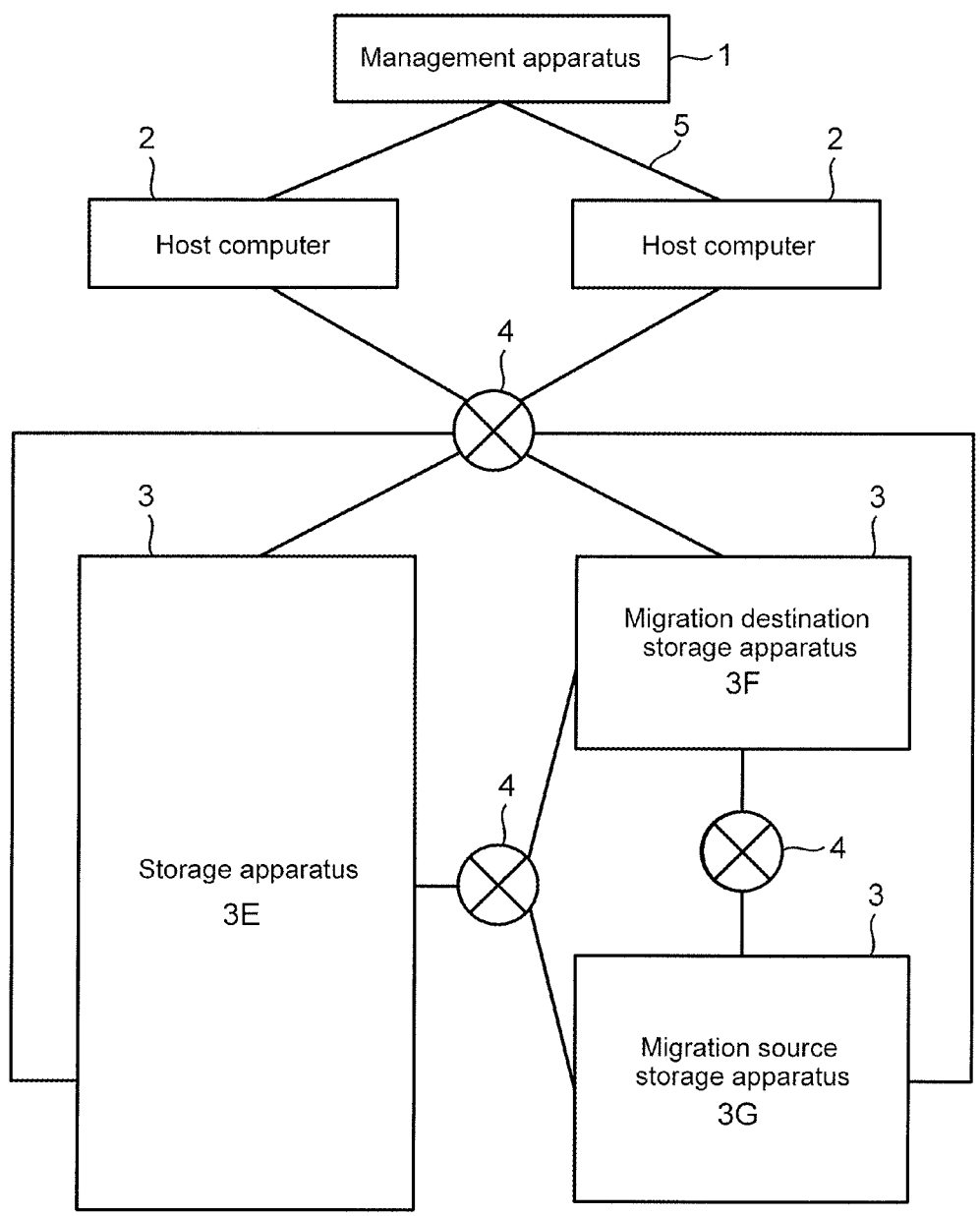
FIG. 18 is a diagram showing a configuration of a computer system of Embodiment 2.

FIG. 18 is a diagram showing the configuration of the computer system of this embodiment. Multiple storage apparatuses 3 are coupled to one or more host computers 2 via networks 4.

A storage apparatus 3E, a migration destination storage apparatus 3F, and a migration source storage apparatus 3G are hereinafter described as the storage apparatuses 3. The storage apparatus 3E and the migration source storage apparatus 3G form an HA configuration for improving the storage availability.

The computer system of this embodiment can migrate the Active-Active type HA pair made up of the storage apparatus 3E and the migration source storage apparatus 3G to the storage apparatus 3E and the migration destination storage apparatus 3F while maintaining the HA configuration. Here, the HA pair migration is to migrate data in the one logical device 33 of the HA pair included in the migration source storage apparatus 3G to the migration destination storage apparatus 3F, and migrate data in the other logical device 33 of the HA pair included in the storage apparatus 3E to a different logical device in the identical storage apparatus 3E, thereby providing the host computer 2 with the HA pair made up of the storage apparatus 3E and the migration destination storage apparatus 3F. After the HA pair migration, the storage apparatus 3E and the migration destination storage apparatus 3F form the HA configuration.

An HA pair migration method in the computer system of this embodiment is applicable to a case where as to the storage apparatus 3E and the migration source storage apparatus 3G having the HA pair, the one migration source storage apparatus 3G is replaced with the migration destination storage apparatus 3F.

The storage migration process in this embodiment is basically identical to the process described with reference to FIG. 9. The different points are hereinafter described.

In a case where the volume attribute 30132 of the logical device 33 of the HA pair included in the storage apparatus 3E is "Primary" and the volume attribute 30132 of the logical device of the HA pair included in the migration source storage apparatus 3G is "Secondary", the migration destination storage apparatus 3F performs a process analogous to that of the migration destination secondary storage apparatus 3B in the storage migration process in Embodiment 1. The migration source storage apparatus 3G performs a process analogous to that of the migration source secondary storage apparatus 3D in the storage migration process in Embodiment 1.

On the other hand, the storage apparatus 3E performs both the processes of the migration destination primary storage apparatus 3A and the migration source primary storage apparatus 3C in Embodiment 1. The operation pertaining to the storage apparatus 3E in the storage migration process is hereinafter described.

In step S1000, upon receipt of an instruction from the management apparatus 1, the storage apparatus 3E virtualizes the migration source primary logical device 33C included in the storage apparatus 3E as a mapping destination primary virtual device 32A in the storage apparatus 3E. At this time, the storage apparatus 3E changes, to "OFF", the read cache mode 30124 of the entry that is of the logical device management table 3012 included in the storage apparatus 3E and corresponds to the mapping destination primary logical device 33A, and changes the write cache mode 30125 to "OFF".

In step S1002, upon receipt of an instruction from the management apparatus 1, the storage apparatus 3E creates a migration destination primary virtual device 32A' and a migration destination primary logical device 33A' in the storage apparatus 3E.

In step S1004, upon receipt of an instruction from the management apparatus 1, the host computer 2 changes the issuance destination of the input and output requests, from the migration source primary logical device 33C to the mapping destination primary logical device 33A in the storage apparatus 3E.

In S1005, the storage apparatus 3E and the migration destination storage apparatus 3F create the HA pair made up of the mapping destination primary logical device 33A and the mapping destination secondary logical device 33B. The storage apparatus 3E changes, to "ON", the read cache mode 30124 of the entry that is of the logical device management table 3012 included in the storage apparatus 3E and corresponds to the mapping destination primary logical device 33A, and changes the write cache mode 30125 to "THROUGH".

In step S1006, upon receipt of an instruction from the management apparatus 1, the storage apparatus 3E copies the data in all the areas of the mapping destination primary logical device 33A to the migration destination primary logical device 33A'. After completion of the copying, the storage apparatus 3E exchanges the mapping destination primary logical device 33A and the virtual device 32 associated with the migration destination primary logical device 33A' for each other. Furthermore, the storage apparatus 3E changes the write cache mode 30125 of the entry that is of the logical device management table 3012 included in the storage apparatus 3E and corresponds to the mapping destination primary logical device 33A to "BACK".

Furthermore, also in a case where the volume attribute 30132 of the logical device 33 of the HA pair included in the storage apparatus 3E is "Secondary" and the volume attribute 30132 of the logical device 33 of the HA pair included in the migration source storage apparatus 3G is "Primary", the storage migration process is executed in an analogous manner. In this case, the migration destination storage apparatus 3F performs a process analogous to that of the migration destination primary storage apparatus 3A in the storage migration process in Embodiment 1. Furthermore, the migration destination storage apparatus 3G performs a process analogous to that of the migration source primary storage apparatus 3C in the storage migration process in Embodiment 1. On the other hand, the storage apparatus 3E performs both the processes of the migration destination secondary storage apparatus 3B and the migration source secondary storage apparatus 3D in Embodiment 1.

REFERENCE SIGNS LIST

1 Management apparatus, 2 Host computer, 3 Storage apparatus, Network, 5 Network, 30 Controller, 31 Storage device, 32 Virtual device, 33 Logical device, 300 CPU, 301 Memory, 302 Port, 303 Cache memory, 3010 Input and output control program, 3011 Virtual device management table, 3012 Logical device management table, 3013 Pair management table, 3014 Cache management table

The invention claimed is:

1. A data migration method in a computer system including a plurality of storage apparatuses each including a storage device constituting a virtual device associated with a logical device, and a controller configured to manage the logical device, the method comprising:

where a first logical device is included in a first storage apparatus and a second logical device is included in a second storage apparatus form a first HA (High Availability) pair;

virtualizing the first logical device as a first virtual device included in a third storage apparatus, associating the first virtual device with a third logical device included in the third storage apparatus, virtualizing the second logical device as a second virtual device included in a fourth storage apparatus, and associating the second virtual device with a fourth logical device included in the fourth storage apparatus;

forming a second HA pair which comprises the third logical device included in the third storage apparatus and the fourth logical device included in the fourth storage apparatus;

after forming the second HA pair, migrating data in the first logical device included in the first storage apparatus to the third storage apparatus, managing the data in the third logical device, migrating data in the second logical device included in the second storage apparatus to the fourth storage apparatus, and managing the data in the fourth logical device;

changing an issuance destination of an input and output request of a host computer from the first logical device included in the first storage apparatus to the third logical device included in the third storage apparatus, and changing an issuance destination of an input and output request of the host computer from the second logical device included in the second storage apparatus to the fourth logical device included in the fourth storage apparatus;

when the third storage apparatus receives a write request to the third logical device from the host computer, causing the third storage apparatus to store write-data for the write request in a cache memory included in the third storage apparatus, destage the write-data to the first logical device of the first storage apparatus;

causing the third storage apparatus to transmit an update copy request containing the write-data to the fourth storage apparatus; and upon receiving the update copy request, causing the fourth storage apparatus to manage the write-data in the update copy request as data that is not to be destaged to the second logical device of the second storage apparatus.

2. The data migration method according to claim 1, wherein when destaging the write-data to the first logical device of the first storage apparatus, the method executes:

causing the first storage apparatus to store the write-data in a cache memory included in the first storage apparatus;

causing the first storage apparatus to transmit an update copy request containing the write-data to the second storage apparatus; and causing the second storage apparatus to store the write-data in a cache memory included in the second storage apparatus, and the method comprising:
  causing the first storage apparatus to asynchronously execute a process of destaging the write-data stored in the cache memory included in the first storage apparatus to a storage device constituting a virtual device associated with the first logical device, and
  causing the second storage apparatus to asynchronously execute a process of destaging the write-data stored in the cache memory included in the second storage apparatus to a storage device constituting a virtual device associated with the second logical device.

3. The data migration method according to claim 2, the method further comprising:
  when the fourth storage apparatus receives a write request to the fourth logical device from the host computer, causing the fourth storage apparatus to transmit an update copy request containing the write-data to the third storage apparatus;
  upon receiving the update copy request, causing the third storage apparatus to manage the write-data in the update copy request as data that is not to be destaged to the first logical device of the first storage apparatus; and
  causing the fourth storage apparatus to store the write-data in a cache memory included in the fourth storage apparatus, and destage the write-data for the write request to the second logical device of the second storage apparatus.

4. The data migration method according to claim 3, wherein when the write-data is destaged to the second logical device of the second storage apparatus,
  the method comprising:
    causing the second storage apparatus to transmit an update copy request containing the write-data to the first storage apparatus;
    causing the first storage apparatus to store the write-data in the cache memory included in the first storage apparatus; and
    causing the second storage apparatus to store the write-data in the cache memory included in the second storage apparatus,
  the method comprising:
    causing the first storage apparatus to asynchronously execute a process of destaging the write-data stored in the cache memory included in the first storage apparatus to the storage device constituting the virtual device associated with the first logical device, and
    causing the second storage apparatus to asynchronously execute a process of destaging the write-data stored in the cache memory included in the second storage apparatus to the storage device constituting the virtual device associated with the second logical device.

5. The data migration method according to claim 4, the method further comprising:
  when the third storage apparatus receives a query request from the host computer, causing the third storage apparatus to transmit a response pertaining to the third logical device that is one element of the second HA pair to the host computer; and
  when the forth storage apparatus receives a query request from the host computer, causing the fourth storage apparatus to transmit a response pertaining to the fourth logical device that is another element of the second HA pair to the host computer,
  wherein the response pertaining to the third logical device is identical to the response pertaining to the fourth logical device.

6. The data migration method according to claim 5, the method further comprising:
  when the first storage apparatus receives a query request from the host computer, causing the first storage apparatus to transmit a response pertaining to the first logical device that is one element of the first HA pair to the host computer; and
  when the second storage apparatus receives a query request from the host computer, causing the second storage apparatus to transmit a response pertaining to the second logical device that is another element of the first HA pair to the host computer,
  wherein the response pertaining to the first logical device, the response pertaining to the second logical device, the response pertaining to the third logical device, and the response pertaining to the fourth logical device are identical to each other.

7. A data migration method in a computer system including a plurality of storage apparatuses each including a storage device constituting a virtual device associated with a logical device, and a controller configured to manage the logical device, the method comprising:
  where a first logical device is included in a first storage apparatus and a second logical device is included in a second storage apparatus form a first HA (High Availability) pair;
    virtualizing the first logical device as a first virtual device included in a third storage apparatus, associating the first virtual device with a third logical device included in the third storage apparatus, virtualizing the second logical device as a second virtual device included in the second storage apparatus, and associating the second virtual device with the fourth logical device included in the second storage apparatus;
  forming a second HA pair which comprises the third logical device included in the third storage apparatus and the fourth logical device included in the second storage apparatus;
  after forming the second HA pair, migrating data in the first logical device included in the first storage apparatus to the third storage apparatus, managing the data in the third logical device, and managing data in the second logical device included in the second storage apparatus as data in the fourth logical device;
  changing an issuance destination of an input and output request of a host computer from the first logical device included in the first storage apparatus to the third logical device included in the third storage apparatus, and
  changing an issuance destination of an input and output request of the host computer from the second logical device included in the second storage apparatus to the fourth logical device;
  when the third storage apparatus receives a write request to the third logical device from the host computer, causing the third storage apparatus to store write-data for the write request in a cache memory included in the third storage apparatus, and destage the write-data to the first logical device of the first storage apparatus;
  causing the third storage apparatus to transmit an update copy request containing the write-data to the second storage apparatus; and upon receiving the update copy request, causing the second storage apparatus to manage the write-data in the update copy request as data that is not to be destaged to the second logical device of the second storage apparatus.

8. A computer system comprising a plurality of storage apparatuses each including a storage device constituting a virtual device associated with a logical device, and a controller configured to manage the logical device, the computer system further comprising:
- a first storage apparatus comprising a first logical device;
- a second storage apparatus comprising a second logical device configured to form a first HA (High Availability) pair with the first logical device;
- a third storage apparatus comprising a first virtual device in which the first logical device is virtualized, and a third logical device associated with the first virtual device;
- a fourth storage apparatus comprising a second virtual device in which the second logical device is virtualized, and a fourth logical device associated with the second virtual device; and
- a host computer;
- wherein the third storage apparatus and the fourth storage apparatus are configured to cause the third logical device included in the third storage apparatus and the fourth logical device included in the fourth storage apparatus to form a second HA pair,
- after the second HA pair is formed, the third storage apparatus is configured to migrate data in the first logical device included in the first storage apparatus to the third storage apparatus, and manage the data in the third logical device, and
- after the second HA pair is formed, the fourth storage apparatus is configured to migrate data in the second logical device included in the second storage apparatus to the fourth storage apparatus, and manage the data in the fourth logical device;
- the host computer is configured to change an issuance destination of an input and output request of the host computer from the first logical device included in the first storage apparatus to the third logical device included in the third storage apparatus, and change an issuance destination of an input and output request of the host computer from the second logical device included in the second storage apparatus to the fourth logical device included in the fourth storage apparatus;
- when the third storage apparatus receives a write request to the third logical device from the host computer, the third storage apparatus is configured to store write-data for the write request in a cache memory included in the third storage apparatus, and destage the write-data to the first logical device of the first storage apparatus;
- the third storage apparatus is configured to transmit an update copy request containing the write-data to the fourth storage apparatus; and
- upon receiving the update copy request, the fourth storage apparatus is configured to manage the write-data in the update copy request as data that is not to be destaged to the second logical device of the second storage apparatus.

* * * * *